(12) United States Patent
Chu et al.

(10) Patent No.: US 10,320,690 B1
(45) Date of Patent: Jun. 11, 2019

(54) METHODS AND APPARATUS FOR RANGE MEASUREMENT

(71) Applicant: Marvell International Ltd., Hamilton (BM)

(72) Inventors: Liwen Chu, San Ramon, CA (US); Sagar A. Tamhane, Santa Clara, CA (US); Hongyuan Zhang, Fremont, CA (US); Sudhir Srinivasa, Campbell, CA (US); Hui-Ling Lou, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 15/353,544

(22) Filed: Nov. 16, 2016

Related U.S. Application Data

(60) Provisional application No. 62/255,806, filed on Nov. 16, 2015.

(51) Int. Cl.
| | | |
|---|---|---|
| *H04L 12/841* | (2013.01) | |
| *H04L 12/26* | (2006.01) | |
| *H04L 29/08* | (2006.01) | |
| *H04W 84/12* | (2009.01) | |

(52) U.S. Cl.
CPC ........ *H04L 47/283* (2013.01); *H04L 43/0858* (2013.01); *H04L 69/323* (2013.01); *H04W 84/12* (2013.01)

(58) Field of Classification Search
CPC .. H04L 47/283; H04L 43/0858; H04L 69/323
See application file for complete search history.

(56) References Cited

PUBLICATIONS

IEEE Std 802.11-REVmc™/D4.0, Jan. 2015 "Draft Standard for Information technology—Telecommunications and information exchange between systems—Local and metropolitan area networks—Specific requirements, Part 11: Wireless LAN Medium Access Control (MAC) and Physical Layer (PHY) Specifications," The Institute of Electrical and Electronics Engineers, Inc., pp. i-cii, 293-297, 340-344, 390-392, 765, 766, 814-816, 853-859, 895-897, 1050-1054, 1137-1140, 1538-1547, 1673-1676, 1709, 1710, 1734-1743, 2152-2154, 3565, 3566 (Jan. 2015).

(Continued)

*Primary Examiner* — Yemane Mesfin
*Assistant Examiner* — Henry Baron

(57) ABSTRACT

A first communication device generates a physical layer (PHY) protocol data unit having a beginning portion and an ending portion, where the beginning portion includes a PHY protocol header having a PHY protocol preamble, and the ending portion includes a reference signal. The PHY protocol data unit prompts a second communication device to record a first time corresponding to reception of the reference signal by the second communication device. The first communication device transmits the PHY protocol data unit, records a second time corresponding to transmission of the reference signal by the first communication device. The first communication device calculates a time of flight of the PHY protocol data unit using the second time, and/or transmits the second time to the second communication device, a third communication device, or both, to facilitate calculation of the time of flight of the PHY protocol data unit using the second time.

20 Claims, 12 Drawing Sheets

(56) References Cited

PUBLICATIONS

IEEE Std 802.11-REVmc™/D8.0, Aug. 2016, "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. i-civ, 291-294, 336-341, 387-389, 771-773, 819-821, 858-865, 901-903, 1062-1066, 1158-1161, 1552-1571, 1703-1707, 1740, 1741, 1765-1775, 2193, 2194, 3601, 3602 (Aug. 2016).
IEEE Std 802.11ac/D7.0, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," The Institute of Electrical and Electronics Engineers, Inc., pp. 1-456 (Sep. 2013).
IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).
IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).
IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).
IEEE Std 802.11™ 2012, (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std P802.11-REVmc™/D8.0, (Revision of IEEE Std 802.11™—2012), "Draft Standard for Information Technology—Telecommunications and information exchange between systems—Local and metropolitan area networks—Specific requirements," Part 11: Wireless LAN Medium Access Control (MAC) and Physical Layer (PHY) Specifications, The Institute of Electrical and Electronics Engineers, Inc., 3775 pages (Aug. 2016).
U.S. Appl. No. 14/687,705, Chu et al., "Peer to Peer Ranging Exchange," filed Apr. 15, 2015.
U.S. Appl. No. 15/041,911, Chu et al., "Methods and Apparatus for Range Measurement," filed Feb. 11, 2016.
U.S. Appl. No. 15/041,954, Chu et al., "Methods and Apparatus for Range Measurement," filed Feb. 11, 2016.

*Prior Art* under US 10,320,690 B1

METHODS AND APPARATUS FOR RANGE MEASUREMENT

CROSS REFERENCES TO RELATED APPLICATIONS

This application claims the benefit of U.S. Provisional Patent Application No. 62/255,806, entitled "Accurate Ranging Measurement," filed on Nov. 16, 2015, which is hereby expressly incorporated herein by reference in its entirety.

FIELD OF TECHNOLOGY

The present disclosure relates generally to wireless communication systems and, more particularly, to measuring a time of flight between wireless communication devices.

BACKGROUND

In some wireless communication systems, it may be useful to determine positions of wireless communication devices. Some techniques for determining positions of wireless communication devices involve determining distances between communication devices, and using distance measurements to calculate positions of the devices. A distance between two devices can be determined by transmitting a signal from one device to another, determining the time it took for the transmitted signal to travel between the two devices (time of flight), and then calculating the distance between the two devices based on the time of flight.

SUMMARY

In an embodiment, a method includes: generating, at a first communication device, a physical layer (PHY) protocol data unit having i) a beginning portion and ii) an ending portion, wherein the beginning portion includes a PHY protocol header having a PHY protocol preamble, the ending portion includes a reference signal, and the PHY protocol data unit is configured to prompt a second communication device to record a first time corresponding to reception of the reference signal by the second communication device; causing the first communication device to transmit the PHY protocol data unit; recording, at the first communication device, a second time corresponding to transmission of the reference signal by the first communication device; and at least one of: i) calculating, at the first communication device, a time of flight of the PHY protocol data unit using the second time, and ii) causing the first communication device to transmit the second time to one or more of a) the second communication device and b) a third communication device to facilitate calculation of the time of flight of the PHY protocol data unit using the second time.

In another embodiment, an apparatus comprises a network interface device associated with a first communication device, the network interface device having one or more integrated circuit devices. The one or more integrated circuit devices are configured to: generate a physical layer (PHY) protocol data unit having i) a beginning portion and ii) an ending portion, wherein the beginning portion includes a PHY protocol header having a PHY protocol preamble, the ending portion includes a reference signal, and the PHY protocol data unit is configured to prompt a second communication device to record a first time corresponding to reception of the reference signal by the second communication device. The one or more integrated circuit devices are further configured to: transmit the PHY protocol data unit, record a second time corresponding to transmission of the reference signal by the first communication device, and at least one of: i) calculate a time of flight of the PHY protocol data unit using the second time, and ii) transmit the second time to one or more of a) the second communication device and b) a third communication device to facilitate calculation of the time of flight of the PHY protocol data unit using the second time.

In yet another embodiment, a method includes: receiving, at a first communication device, a physical layer (PHY) protocol data unit having i) a beginning portion and ii) an ending portion, wherein the beginning portion includes a PHY protocol header having a PHY protocol preamble, the ending portion includes a reference signal, and the PHY protocol data unit is configured to prompt the first communication device to record a first time corresponding to reception of the reference signal by the first communication device; recording, at the first communication device, the first time corresponding to reception of the reference signal by the first communication device; and at least one of: i) calculating, at the first communication device, a time of flight of the PHY protocol data unit using the first time, and ii) causing the first communication device to transmit the first time to a second communication device to facilitate calculation of the time of flight of the PHY protocol data unit using the first time.

In still another embodiment, an apparatus comprises a network interface device associated with a first communication device, the network interface device having one or more integrated circuit devices. The one or more integrated circuit devices are configured to: receive a physical layer (PHY) protocol data unit having i) a beginning portion and ii) an ending portion, wherein the beginning portion includes a PHY protocol header having a PHY protocol preamble, the ending portion includes a reference signal, and the PHY protocol data unit is configured to prompt the first communication device to record a first time corresponding to reception of the reference signal by the first communication device. The one or more integrated circuit devices are further configured to: record the first time corresponding to reception of the reference signal by the first communication device, and at least one of: i) calculate a time of flight of the PHY protocol data unit using the first time, and ii) transmit the first time to a second communication device to facilitate calculation of the time of flight of the PHY protocol data unit using the first time.

In another embodiment, a method includes: generating, at a first communication device, a first physical layer (PHY) protocol data unit, wherein the first PHY protocol data unit is configured to prompt a second communication device to record a first time corresponding to reception of a second PHY protocol data unit by the second communication device; causing the first communication device to transmit the first PHY protocol data unit; generating, at the first communication device, the second PHY protocol data unit; causing the first communication device to begin transmitting the second PHY protocol data unit at a predefined time period after an end of the first PHY protocol data unit; recording, at the first communication device, a second time corresponding to transmission of the second PHY protocol data unit by the first communication device; and at least one of: i) calculating, at the first communication device, a time of flight of the second PHY protocol data unit using the second time, and ii) causing the first communication device to transmit the second time to one or more of a) the second communication device and b) a third communication device to facilitate calculation of the time of flight of the second PHY protocol data unit using the second time.

In another embodiment, an apparatus comprises a network interface device associated with a first communication device, the network interface device having one or more integrated circuit devices. The one or more integrated circuit devices are configured to: generate a first physical layer (PHY) protocol data unit, wherein the first PHY protocol data unit is configured to prompt a second communication device to record a first time corresponding to reception of a second PHY protocol data unit by the second communication device. The one or more integrated circuit devices are further configured to: transmit the first PHY protocol data unit, generate the second PHY protocol data unit, transmit the second PHY protocol data unit, wherein the transmission of the second PHY protocol data unit begins at a predefined time period after an end of the first PHY protocol data unit, record a second time corresponding to transmission of the second PHY protocol data unit by the first communication device, and at least one of: i) calculate a time of flight of the second PHY protocol data unit using the second time, and ii) transmit the second time to one or more of a) the second communication device and b) a third communication device to facilitate calculation of the time of flight of the second PHY protocol data unit using the second time.

In yet another embodiment, a method includes: receiving, at a first communication device, a first physical layer (PHY) protocol data unit, wherein the first PHY protocol data unit is configured to prompt the first communication device to record a first time corresponding to reception of a second PHY protocol data unit by the first communication device; receiving, at the first communication device, the second PHY protocol data unit, wherein reception of the second PHY protocol data unit begins at a predefined time period after an end of the first PHY protocol data unit; recording, at the first communication device, the first time corresponding to reception of the second PHY protocol data unit by the first communication device; and at least one of: i) calculating, at the first communication device, a time of flight of the second PHY protocol data unit using the first time, and ii) causing the first communication device to transmit the first time to a second communication device to facilitate calculation of the time of flight of the second PHY protocol data unit using the first time.

In still another embodiment, an apparatus comprises a network interface device associated with a first communication device, the network interface device having one or more integrated circuit devices. The one or more integrated circuit devices are configured to: receive a first physical layer (PHY) protocol data unit, wherein the first PHY protocol data unit is configured to prompt the first communication device to record a first time corresponding to reception of a second PHY protocol data unit by the first communication device, receive the second PHY protocol data unit, wherein reception of the second PHY protocol data unit begins at a predefined time period after an end of the first PHY protocol data unit, record the first time corresponding to reception of the second PHY protocol data unit by the first communication device, and at least one of: i) calculate a time of flight of the second PHY protocol data unit using the first time, and ii) transmit the first time to a second communication device to facilitate calculation of the time of flight of the second PHY protocol data unit using the first time.

DETAILED DESCRIPTION

Range calculation techniques described below are discussed in the context of wireless local area networks (WLANs) that utilize protocols the same as or similar to protocols defined by the 802.11 Standard from the Institute of Electrical and Electronics Engineers (IEEE) merely for explanatory purposes. In other embodiments, however, range calculation techniques are utilized in other types of wireless communication systems (e.g., wireless wide area network (WWAN), cellular network, wireless metropolitan area network (WMAN), wireless personal area network (WPAN), etc.).

Figure 1:
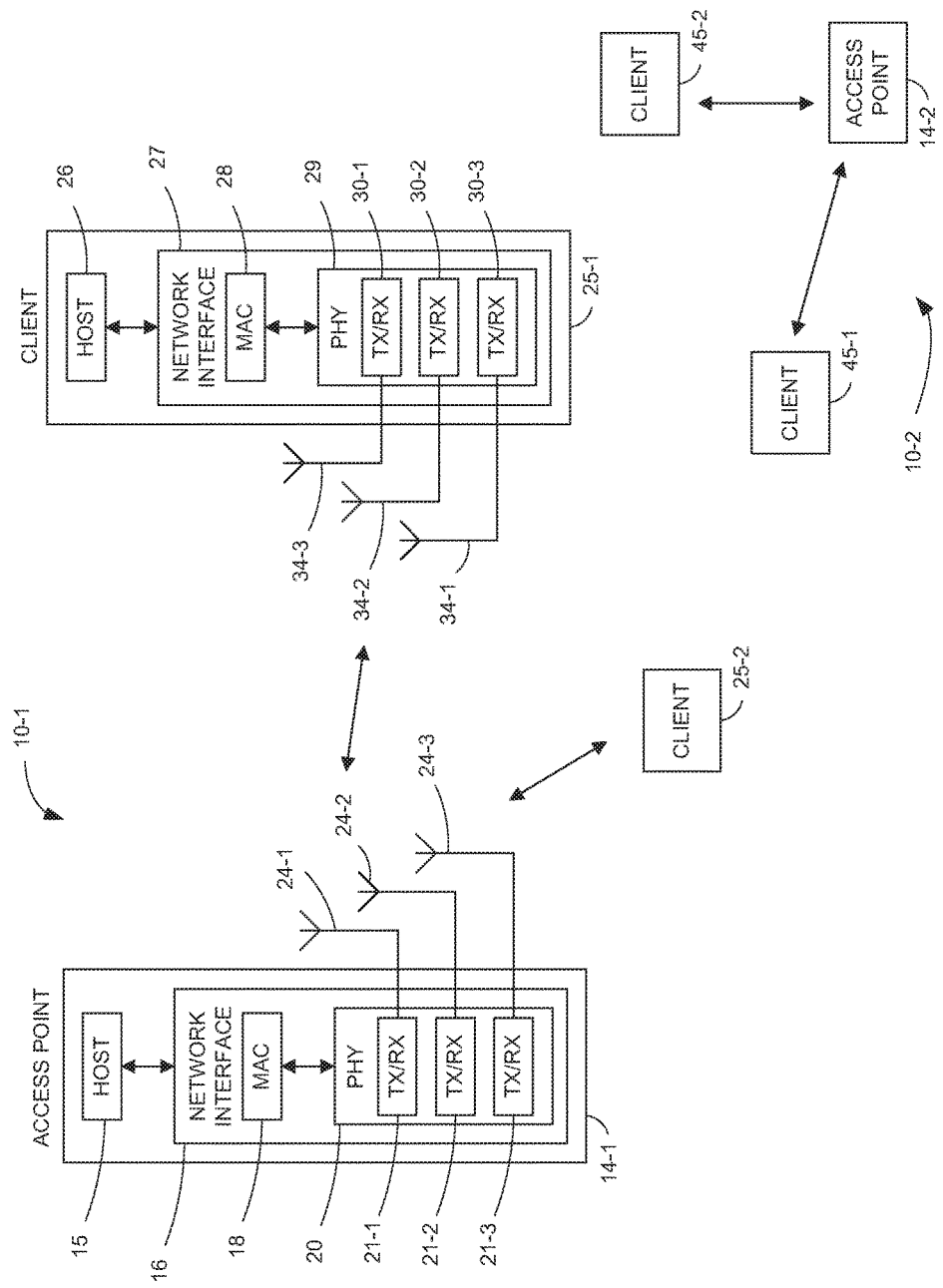
FIG. 1 is a block diagram of an example system having multiple wireless local area networks (WLANs), according to an embodiment of the present disclosure.

FIG. 1 is a block diagram of an example system including multiple WLANs 10, according to an embodiment. The number of WLANs depicted is only intended to be illustrative, and any suitable number may be present. For example, a first WLAN 10-1 includes at least one access point (AP) 14-1. The configuration of the AP 14 varies among different embodiments, but a typical configuration will now be described, using the AP 14-1 as an example. The AP 14-1 includes a host processor 15 coupled to a network interface device 16. In an embodiment, the network interface device 16 includes one or more integrated circuits (ICs) configured to operate as discussed below. The network interface device 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14-1 includes other suitable numbers (e.g., 1, 2, 4, 5, etc.) of transceivers 21 and antennas 24 in other embodiments. Although AP 14-1 includes the same number of antennas 24 and transceivers 21, in some embodiments the AP 14-1 includes a different number of antennas 24 than transceivers 21, and antenna switching techniques are utilized.

In various embodiments, the network interface device 16 is implemented on one or more integrated circuit (IC) devices. For example, in an embodiment, at least a portion of the MAC processing unit 18 is implemented on a first IC device and at least a portion of the PHY processing unit 20 is implemented on a second IC device. As another example, at least a portion of the MAC processing unit 18 and at least a portion of the PHY processing unit 20 are implemented on a single IC device.

The WLAN 10-1 includes a plurality of client stations 25. Although two client stations 25-1 and 25-2 are illustrated in FIG. 1, the WLAN 10-1 includes other suitable numbers (e.g., 1, 3, 4, 5, 6, etc.) of client stations 25 in various scenarios and embodiments. The configuration of the client station 25 varies among different embodiments, but a typical configuration will now be described, using the client station 25-1 as an example. The client station 25-1 includes a host processor 26 coupled to a network interface device 27. In an embodiment, the network interface device 27 includes one or more ICs configured to operate as discussed below. The network interface device 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. Although the client station 25-1 includes the same number of antennas 34 and transceivers 30, in some embodiments the client station 25-1 includes a different number of antennas 34 than transceivers 30, and antenna switching techniques are utilized.

In various embodiments, the network interface device 27 is implemented on one or more IC devices. For example, in an embodiment, at least a portion of the MAC processor 28 is implemented on at least a first IC device, and at least a portion of the PHY processor 29 is implemented on at least a second IC device. In another embodiment, at least a portion of the MAC processor 28 and at least a portion of the PHY processor 29 are implemented on a single IC device.

In an embodiment, the client station 25-2 has a structure that is the same as or similar to the client station 25-1. In these embodiments, the client station 25-2 structured the same as or similar to the client station 25-1 has the same or a different number of transceivers and antennas. For example, the client station 25-2 has only two transceivers and two antennas (not shown), according to an embodiment.

The system illustrated in FIG. 1 also includes a second WLAN 10-2. The WLAN 10-2 includes an AP 14-2 and a plurality of client stations 45. In an embodiment, the AP 14-2 has a structure that is the same as or similar to the AP 14-1. In these embodiments, the AP 14-2 structured the same as or similar to the AP 14-1 has the same or a different number of transceivers and antennas. For example, the AP 14-2 has only two transceivers and two antennas (not shown), according to an embodiment.

In an embodiment, the client stations 45 each have a respective structure that is the same as or similar to the client station 25-1. In these embodiments, each client station 45 structured the same as or similar to the client station 25-1 has the same or a different number of transceivers and antennas. For example, the client station 45-1 has only two transceivers and two antennas (not shown), according to an embodiment.

Although two client stations 45 are illustrated in FIG. 1, the WLAN 10-2 includes other suitable numbers (e.g., 1, 3, 4, 5, 6, etc.) of client stations 45 in various scenarios and embodiments.

In various embodiments, the MAC processor 18 of the AP 14-1 is configured to perform MAC functions defined by a communication protocol, and the PHY processor 20 is configured to perform PHY functions defined by the communication protocol. For example, in various embodiments, the MAC processor 18 and/or the PHY processor 20 of the AP 14-1 are configured to generate data units conforming to the communication protocol. The transceiver(s) 21 is/are configured to transmit the generated data units via the antenna(s) 24. In some embodiments, the MAC processor 18 and/or the PHY processor 20 of the AP 14-1 are configured to record a time at which the AP 14-1 transmitted a generated data unit, according to various embodiments.

Similarly, the transceiver(s) 21 is/are configured to receive data units via the antenna(s) 24. In some embodiments, the MAC processor 18 and/or the PHY processor 20 of the AP 14-1 are configured to process a received data unit, and to determine a time at which the AP 14-1 received the data unit, according to various embodiments.

In various embodiments, the MAC processor 28 of the client device 25-1 is configured to perform MAC functions defined by a communication protocol, and the PHY processor 29 is configured to perform PHY functions defined by the communication protocol. For example, in various embodiments, the MAC processor 28 and the PHY processor 29 of the client device 25-1 are configured to generate data units conforming to the first communication protocol. The transceiver(s) 30 is/are configured to transmit the generated data units via the antenna(s) 34. In some embodiments, the MAC processor 28 and/or the PHY processor 29 of the client device 25-1 are configured to record a time at which the client device 25-1 transmitted a generated data unit, according to various embodiments.

Similarly, the transceiver(s) 30 is/are configured to receive data units via the antenna(s) 34. In some embodiments, the MAC processor 28 and/or the PHY processor 29 of the client device 25-1 are configured to process a received data unit, and to determine a time at which the client device 25-1 received the data unit, according to various embodiments.

In some embodiments, a first communication device (e.g., an access point, a client station) exchanges range measurement signals with a second communication device (e.g., an access point, a client station) to determine a distance between communication devices in the system of FIG. 1. In some embodiments, the determined distances between communication devices are used to determine positions of communication devices in the system of FIG. 1, for example.

Figure 2A:
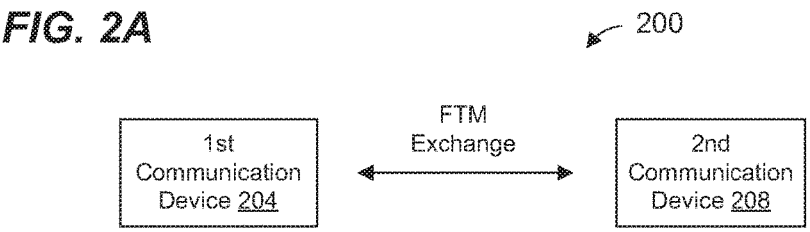
FIG. 2A is a block diagram of a prior art system in which range measurement signals are exchanged between two communication devices.

FIG. 2A is a diagram of an example system 200 in which a first communication device 204 (e.g., AP 14-1, one of the client stations 25, one of the client stations 45, etc., described above and shown in FIG. 1) exchanges range measurement signals with a second communication device 208 (e.g., AP 14-2, another one of the client stations 25, another one of the client stations 45, etc., described above and shown in FIG. 1), according to an embodiment. Range measurement signals are sometimes referred to herein as "fine timing measurement signals" or "FTM signals." In some embodiments, the first communication device 204 and/or the second communication device 208 have structures the same as or similar to the structure of the AP 14-1 and/or the client station 25-1 of the example system shown in FIG. 1. In other embodiments, the first communication device 204 and/or the second communication device 208 are wireless communication devices having suitable structures different than the AP 14-1 and the client station 25-1 of the example system shown in FIG. 1.

Figure 2B:
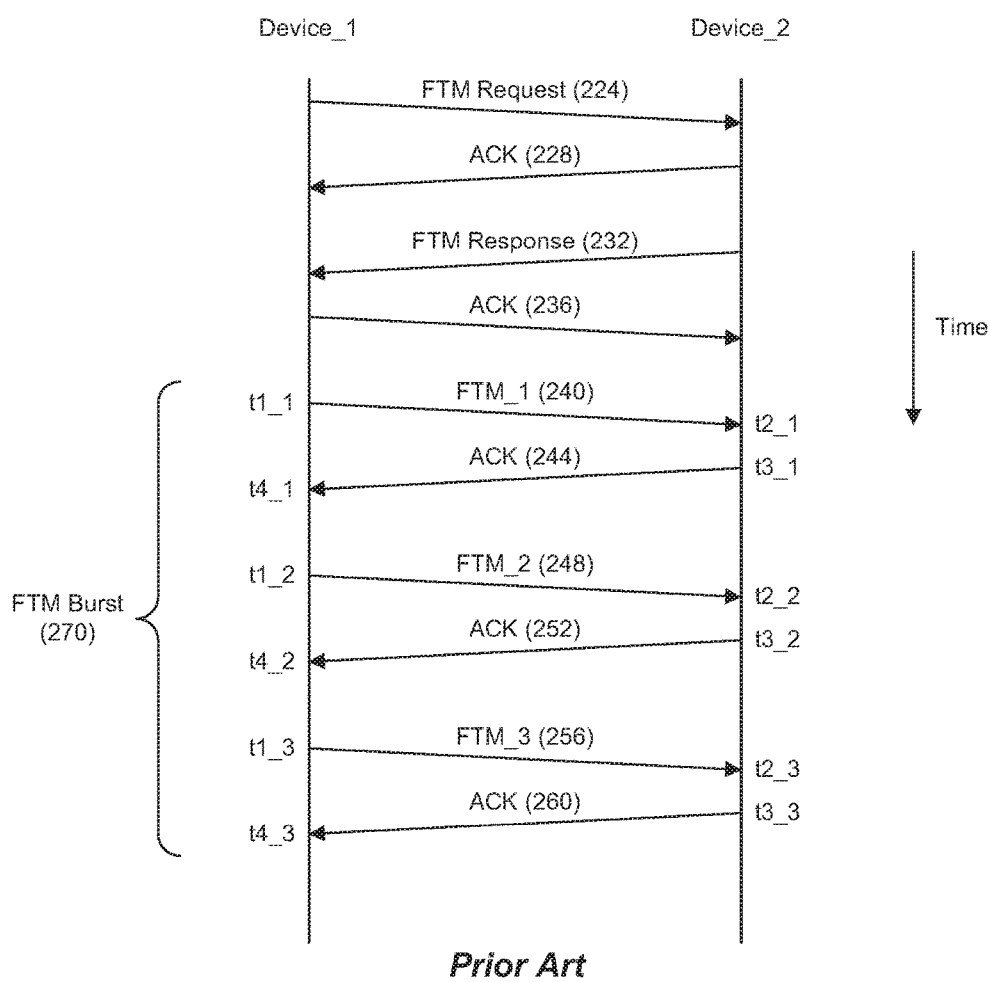
FIG. 2B is a signal timing diagram illustrating an example exchange of range measurement signals between the two communication devices of FIG. 2A.

In some embodiments, the system 200 performs an FTM procedure in which the first communication device 204 and the second communication device 208 exchange FTM signals. For instance, FIG. 2B is a signal timing diagram illustrating an example prior art FTM procedure between the first communication device 204 and the second communication device 208.

The first communication device 204 (Device_1) generates and transmits a FTM request packet (224). In response to the FTM request packet (224), the second communication device 208 (Device_2) generates and transmits an acknowledgment (ACK) packet (228). In an embodiment, Device_2 is configured to transmit the ACK packet (228) a predetermined amount of time, T_ack, after receiving an end of the FTM request packet (224). For example, a communication protocol defines the predetermined amount of time T_ack, in an embodiment. In an embodiment, the predetermined amount of time T_ack is a short interframe space (SIFS) as defined by the IEEE 802.11 Standard.

Also in response to the FTM request packet (224), Device_2 generates and transmits a FTM response packet (232). In response to the FTM response packet (232), Device_1 generates and transmits an ACK packet (236). In an embodiment, Device_1 transmits the ACK packet (236) T_ack after an end of the FTM response packet (232) is received. In some embodiments, Device_2 transmits the ACK packet (228) after an amount of time that is greater than T_ack after receiving an end of the FTM request packet (224). For example, in some scenarios, processing delays in Device_2 may result in Device_2 transmitting the ACK packet (228) after an amount of time that is greater than T_ack after receiving an end of the FTM request packet (224). In some embodiments, Device_1 transmits the ACK packet (236) after an amount of time that is greater than T_ack after receiving the end of the FTM response packet (232). For example, in some scenarios, processing delays in Device_1 may result in Device_1 transmitting the ACK packet (236) after an amount of time that is greater than T_ack after receiving the end of the FTM response packet (232).

In some embodiments, transmission of the FTM request packet (224) and the FTM response packet (232) (and the corresponding ACK packets (228, 236)) is omitted. For example, in some embodiments, Device_2 transmits its ranging capability information in beacons, Probe Response, Association Response, etc. Thus, if Device_1 uses the ranging capability announced by Device_2, Device_1 does not transmit the FTM request packet (224), in some embodiments.

Device_1 generates a FTM packet (240) (FTM_1). At a time t1_1, Device_1 transmits the FTM packet (240), and Device_1 records the time t1_1. In an embodiment, the time t1_1 corresponds to an event at which a beginning of the FTM packet (240) is transmitted. In an embodiment, Device_1 generates the FTM packet (240) to include a time stamp with the value t1_1. In other embodiments, Device_1 does not include a time stamp with the value t1_1 in the FTM packet (240).

At time t2_1, Device_2 receives the FTM packet (240). In an embodiment, Device_2 records the time t2_1 at which the FTM packet (240) was received at Device_2. In an embodiment, the time t2_1 corresponds to an event at which a beginning of the FTM packet (240) is received at Device_2.

In response to the FTM packet (240), Device_2 generates and transmits an ACK packet (244). In an embodiment, AP2 transmits the ACK packet (244) at a time t3_1. In an embodiment, time t3_1 corresponds to t2_1+T_ack. In an embodiment, Device_2 records the time t3_1 at which Device_2 transmits the ACK packet (244). In some embodiments, t3_1 is greater than t2_1+T_ack. For example, in some scenarios, processing delays in Device_2 may result in t3_1 being greater than t2_1+T_ack.

At time t4_1, Device_1 receives the ACK packet (244). In an embodiment, Device_1 records the time t4_1 at which Device_1 receives the ACK packet (244). In an embodiment, the time t4_1 corresponds to an event at which a beginning of the ACK packet (244) is received at Device_1.

Transmission of an FTM packet and a responsive ACK packet (e.g., the FTM packet (240) and the responsive ACK packet (244)) is sometimes referred to herein as an FTM exchange. Thus, the FTM packet (240) and the responsive ACK packet (244) correspond to one FTM exchange. In some embodiments, an FTM signal exchange procedure comprises multiple FTM exchanges.

For instance, FIG. 2B illustrates three FTM signal exchanges. In particular, as part of a second FTM exchange, Device_1 generates an FTM packet (248) (FTM_2). At a time t1_2, Device_1 transmits the FTM packet (248), and Device_1 records the time t1_2. In an embodiment, the time t1_2 corresponds to an event at which a beginning of the FTM packet (248) is transmitted. In an embodiment, Device_1 generates the FTM packet (248) to include a time stamp with the value t1_2. In other embodiments, Device_1 does not include a time stamp with the value t1_2 in the FTM packet (248). In an embodiment, Device_1 generates the FTM packet (248) to include times t1_1 and t4_1, e.g., in a PHY payload portion of the FTM packet (248).

At time t2_2, Device_2 receives the FTM packet (248). In an embodiment, Device_2 records the time t2_2 at which the FTM packet (248) was received at Device_2. In an embodiment, the time t2_2 corresponds to an event at which a beginning of the FTM packet (248) is received at Device_2. As discussed above, in an embodiment, the FTM packet (248) includes times t1_1 and t4_1, e.g., in a PHY payload portion of the FTM packet (248). Thus, in an embodiment, Device_2 records the times t1_1 and t4_1 that were included in the FTM packet (248).

In response to the FTM packet (248), Device_2 generates and transmits an ACK packet (252). In an embodiment, Device_2 transmits the ACK packet (252) at a time t3_2. In an embodiment, time t3_2 corresponds to t2_2+T_ack. In an embodiment, Device_2 records the time t3_2 at which Device_2 transmits the ACK packet (252). In some embodiments, t3_2 is greater than t2_2+T_ack. For example, in some scenarios, processing delays in Device_2 may result in t3_2 being greater than t2_2+T_ack.

At time t4_2, Device_1 receives the ACK packet (252). In an embodiment, Device_1 records the time t4_2 at which Device_1 receives the ACK packet (252). In an embodiment, the time t4_2 corresponds to an event at which a beginning of the ACK packet (252) is received at Device_1.

As part of a third FTM exchange, Device_1 generates an FTM packet (256) (FTM_3). At a time t1_3, Device_1 transmits the FTM packet (256), and Device_1 records the time t1_3. In an embodiment, the time t1_3 corresponds to an event at which a beginning of the FTM packet (256) is transmitted. In an embodiment, Device_1 generates the FTM packet (256) to include a time stamp with the value t1_3. In other embodiments, Device_1 does not include a time stamp with the value t1_3 in the FTM packet (256). In an embodiment, Device_1 generates the FTM packet (256) to include times t1_2 and t4_2, e.g., in a PHY payload portion of the FTM packet (256).

At time t2_3, Device_2 receives the FTM packet (256). In an embodiment, Device_2 records the time t2_3 at which the FTM packet (256) was received at Device_2. As discussed above, in an embodiment, the FTM packet (256) includes times t1_2 and t4_2, e.g., in a PHY payload portion of the FTM packet (256). Thus, in an embodiment, Device_2 records the times t1_2 and t4_2 that were included in the FTM packet (256).

In response to the FTM packet (256), Device_2 generates and transmits an ACK packet (260). In an embodiment, Device_2 transmits the ACK packet (260) at a time t3_3. In an embodiment, time t3_3 corresponds to t2_3+T_ack. In an embodiment, Device_2 records the time t3_3 at which Device_2 transmits the ACK packet (260). In some embodiments, t3_3 is greater than t2_3+T_ack. For example, in some scenarios, processing delays in Device_2 may result in t3_3 being greater than t2_3+T_ack.

At time t4_3, Device_1 receives the ACK packet (260). In an embodiment, Device_1 records the time t4_3 at which Device_1 receives the ACK packet (260). In an embodiment, the time t4_3 corresponds to an event at which a beginning of the ACK packet (260) is received at Device_1.

A group of FTM exchanges is referred to herein as an FTM burst. For example, an FTM burst (270) includes the three FTM exchanges associated with FTM_1, FTM_2, and FTM_3. In some embodiments, an FTM burst may include other suitable number of FTM exchanges, such as one, two, four, five, six, etc.

An estimated round trip time ($RTT_{EST}$) is calculated as:

$$RTT_{EST}=(t4-t1)-(t3-t2) \qquad \text{(Equation 1)}$$

where $RTT_{EST}$ corresponds to an estimate of a cumulative time for a first packet (e.g., a FTM packet such as, for example, FTM_1 (240)) to travel from Device_1 to Device_2, and for a second packet (e.g., an ACK packet such as, for example, ACK (244)) to travel from Device_2 to Device_1, and where t1 corresponds to a time at which the first packet (e.g., the FTM packet) is transmitted by the Device_1, t2 corresponds to a time at which the first packet is received by the Device_2, t3 corresponds to a time at which the second packet (e.g., the ACK packet) is transmitted by the Device_2, and t4 corresponds to a time at which the second packet is received by the Device_1. In some embodiments, a different $RTT_{EST}$ is determined for each of multiple FTM packet/ACK packet exchanges, such as the multiple FTM packet/ACK packet exchanges illustrated in FIG. 2B and described in detail above.

An estimated distance, d, between Device_1 and Device_2 is calculated using $RTT_{EST}$ according to:

$$d=RTT_{EST} \cdot c/2 \qquad \text{(Equation 2)}$$

where c is the speed of light. In some embodiments in which multiple $RTT_{EST}$'s ($RTT_{EST,1}$, $RTT_{EST,2}$, ...) are calculated for multiple FTM packet/ACK packet exchanges, an estimated distance, d, between Device_1 and Device_2 is calculated using $RTT_{EST}$ according to:

$$d=\text{mean}(RTT_{EST,1},RTT_{EST,2},\ldots) \cdot c/2 \qquad \text{(Equation 3)}$$

In some embodiments, an estimated distance, d, is calculated at one or more of Device_1, Device_2, a third device (not shown in FIG. 2A), etc. Thus, in various embodiments, time values and other parameters (if any) necessary for calculating an estimated distance d are sent to the device calculating the estimated distance d (the "calculating device") if the calculating device does not already have the time values/parameters.

In some embodiments, respective estimated distances between various pairs of communication devices are calculated, and the estimated distances are utilized to calculate positions of various communication devices using known techniques (e.g., triangulation techniques, multilateration techniques, or other suitable techniques).

For each FTM packet/ACK packet exchange, Device_1 records times t1 and t4 using a clock of Device_1, and the recorded times according to the clock of Device_1 are denoted as t1' and t4'. The clock of Device_1 will have a clock drift with respect to actual time, and thus:

$$t4-t1=t4'-t1'+\Delta 1 \qquad \text{(Equation 4)}$$

where t1 and t4 are actual time values, and $\Delta 1$ is a time error due to clock drift of the clock of Device_1. The magnitude of $\Delta 1$ grows as t4'−t1' grows.

Similarly, Device_2 records times t2 and t3 using a clock of Device_2, and the recorded times according to the clock of Device_2 are denoted as t2" and t3". The clock of Device_2 will also have a clock drift with respect to actual time, and thus:

$$t3-t2=t3''-t2''+\Delta 2 \qquad \text{(Equation 5)}$$

where t2 and t3 are actual time values, and $\Delta 2$ is a time error due to clock drift of the clock of Device_2. The magnitude of $\Delta 2$ grows as t3"−t2" grows.

Figure 3:
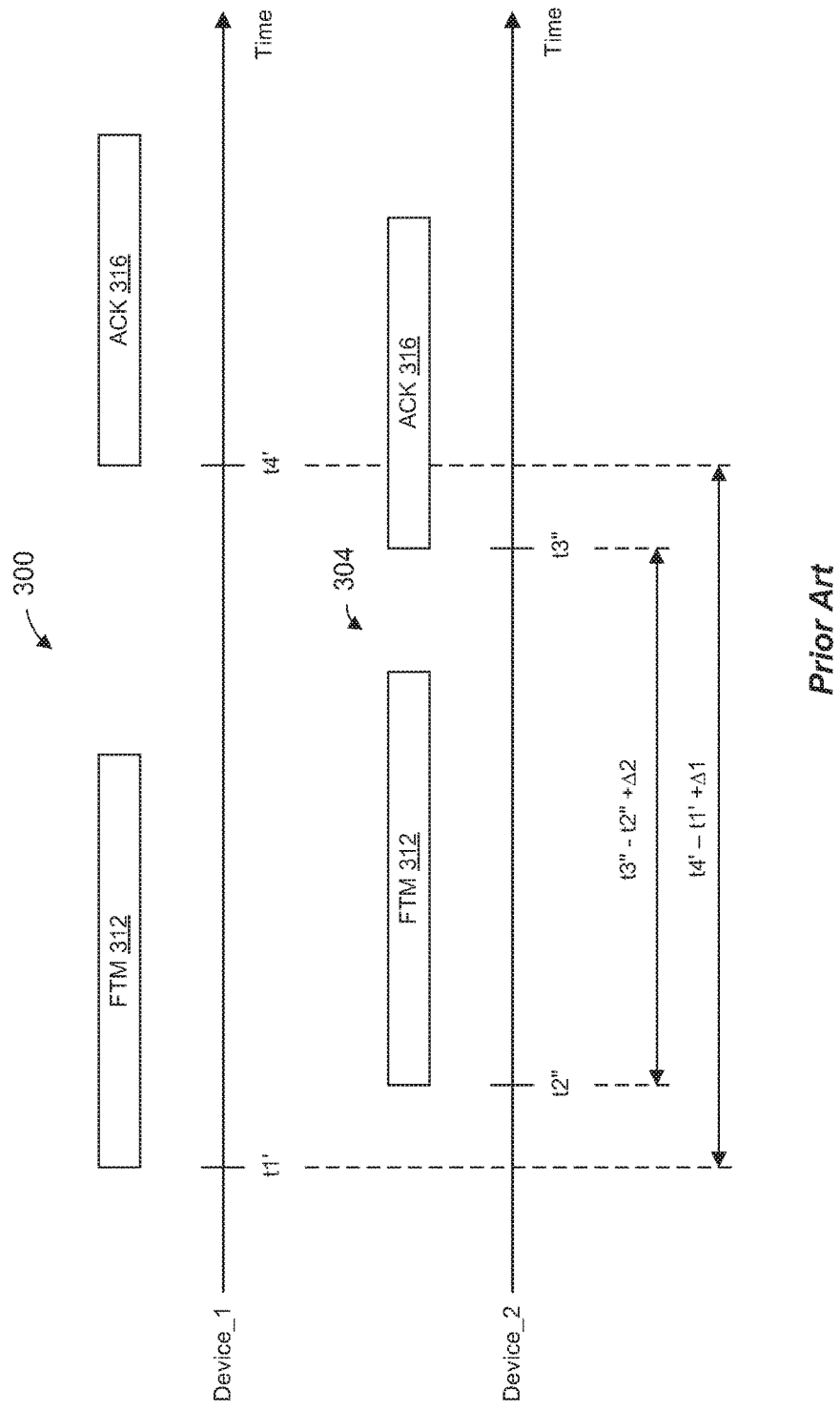
FIG. 3 is a timing diagram of a prior art range measurement signal exchange.

FIG. 3 includes a timing diagram 300 of a FTM packet/ACK packet exchange with respect to Device_1, and a timing diagram 304 of the same FTM packet/ACK packet exchange with respect to Device_2. Device_1 records time t1' (measured with the clock of Device_1), which corresponds to transmission of an FTM packet 312, and records time t4' (measured with the clock of Device_1), which corresponds to reception of an ACK packet 316. Device_2 records time t2" (measured with the clock of Device_2), which corresponds to reception of the FTM packet 312, and records time t3" (measured with the clock of Device_2), which corresponds to transmission of the ACK packet 316. As discussed above, because of clock drift, the measured difference between t4 and t1 includes an error $\Delta 1$, and the measured difference between t3 and t2 includes an error $\Delta 2$. Thus, when considering clock drift, the estimated round trip time is:

$$RTT_{EST}=(t4'-t1'+\Delta 1)-(t3''-t2''+\Delta 2) \qquad \text{(Equation 6)}$$

Therefore, the errors $\Delta 1$ and $\Delta 2$ tend to decrease the accuracy of $RTT_{EST}$.

Figure 4:
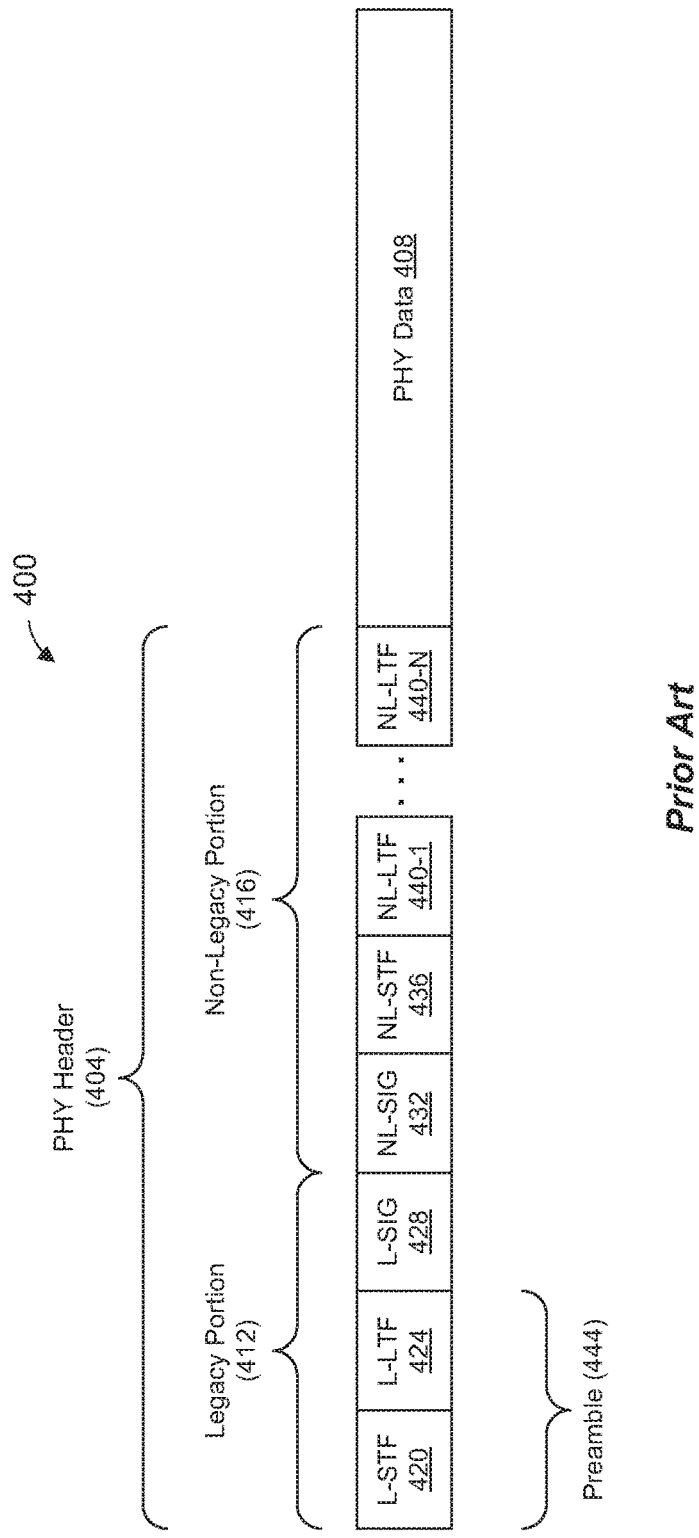
FIG. 4 is a diagram of a prior art physical layer (PHY) protocol data unit.

FIG. 4 is a diagram of an example prior art PHY data unit 400. The FTM packet 312 (FIG. 3) and the ACK packet 316 (FIG. 3) have the format illustrated in FIG. 4. The PHY data unit 400 includes a PHY header 404 and a PHY data portion 408. The PHY header 404 includes a legacy portion 412 and a non-legacy portion 416. The legacy portion 412 conforms to an older version of a communication protocol, whereas the non-legacy portion 416 conforms to a newer version of the communication protocol. Including the legacy portion 412 in the PHY data unit 400 facilitates backward compatibility and coexistence among devices conforming to different versions of the communication protocol. The legacy portion 412 includes a legacy short training field (L-STF) 420, generally used for packet detection, initial synchronization, and automatic gain control, etc. The legacy portion 412 also includes a legacy long training field (L-LTF) 424, generally used for channel estimation and fine synchronization. The legacy portion 412 further includes a legacy signal field (L-SIG) 428, that includes certain PHY parameters corresponding to the PHY data unit 400 (e.g., length, a modulation and coding scheme (MCS), etc.).

The non-legacy portion 416 includes a non-legacy signal field (NL-SIG) 432, that includes certain PHY parameters corresponding to the PHY data unit 400 (e.g., length/duration, a MCS, etc.). The non-legacy portion 416 also includes a non-legacy short training field (NL-STF) 436, generally used for improved synchronization, improved automatic gain control, etc. The non-legacy portion 416 further includes N non-legacy long training fields (NL-LTFs) 440, generally used for channel estimation and fine synchronization, where N is a suitable positive integer. In some embodiments, N corresponds to a number of spatial streams utilized to transmit the data unit 400 and/or for which channel estimation is to be performed.

L-STF 420 and L-LTF 424 are sometimes referred to as a preamble 444. In the FTM packet/ACK packet exchange of FIG. 3, the preamble 444 it utilized to detect when a packet is received. For example, Device_2 utilizes the preamble 444 to detect reception of FTM 312, and time t2" corresponds to when Device_2 detected the preamble 444 in FTM 312. Similarly, Device_1 utilizes the preamble 444 to detect reception of ACK 316, and time t4' corresponds to when Device_1 detected the preamble 444 in ACK 316. Similarly, time t1' corresponds to when Device_1 transmitted the preamble 444 in FTM 312, and time t3" corresponds to when Device_2 transmitted the preamble 444 in ACK 316.

As discussed above, as the magnitudes of the values (t4'-t1') and (t3"-t2") increase, so do the values of time errors Δ1 and Δ2, respectively, which leads to decreased accuracy in the determination of $RTT_{EST}$. Accordingly, one or more embodiments of the present disclosure relates to methods for facilitating time of flight measurements in a communication network so as to decrease the magnitudes of the values (t4'-t1') and (t3"-t2"), thereby leading to in increased accuracy in the determination of $RTT_{EST}$.

Figure 5:
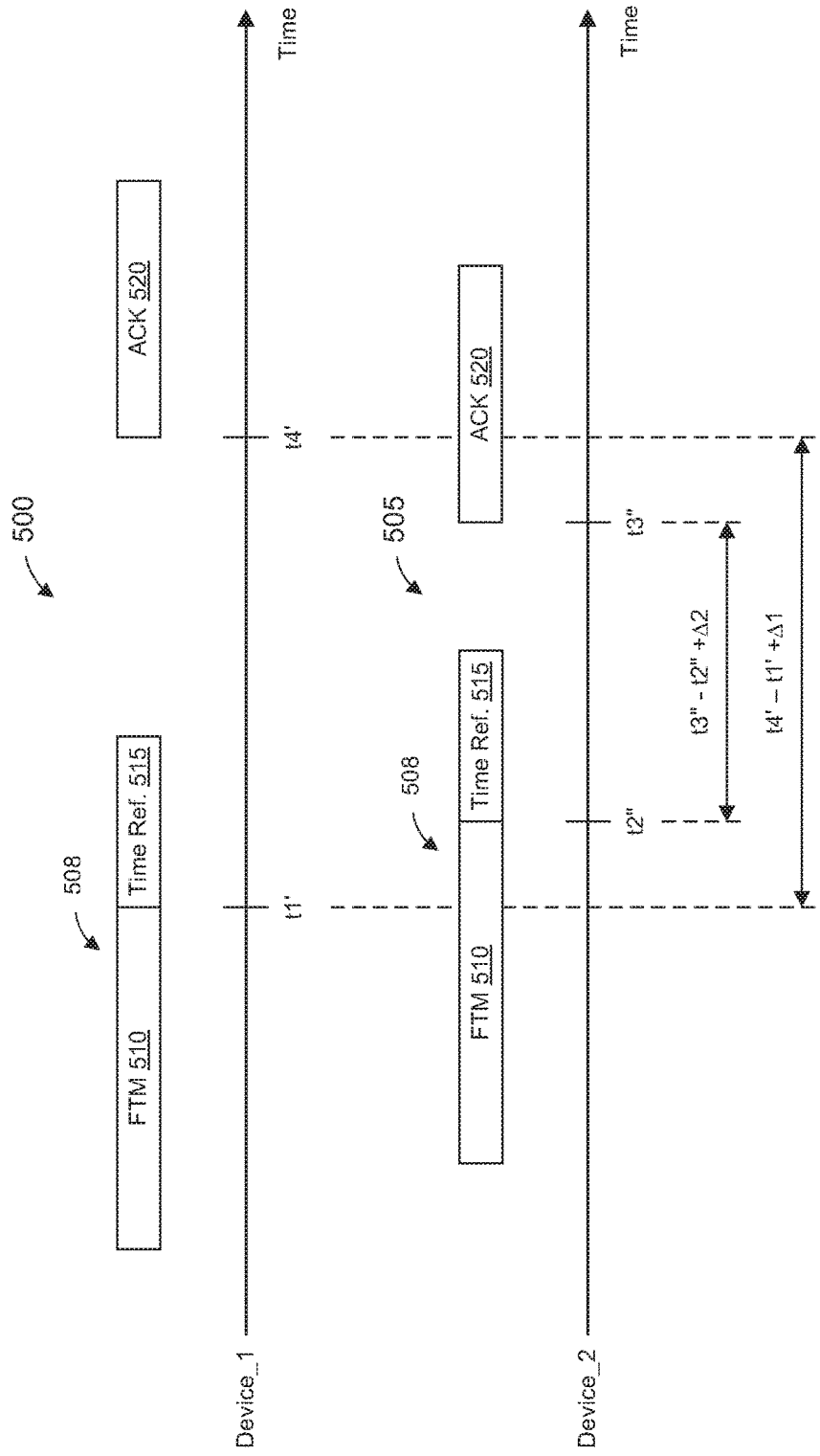
FIG. 5 is a timing diagram of an example range measurement signal exchange, according to an embodiment of the present disclosure.

FIG. 5 includes timing diagrams of an example range measurement signal exchange, according to an embodiment of the present disclosure. Timing diagram 500 is of an example FTM packet/ACK packet exchange with respect to Device_1, and a timing diagram 505 of the same FTM packet/ACK packet exchange with respect to Device_2, according to an embodiment of the present disclosure. In some embodiments, a first packet 508 in the exchange between Device_1 and Device_2 has a beginning portion that includes FTM 510 and an ending portion that includes a timing reference portion 515.

In an embodiment, Device_1 records time t1' (measured with the clock of Device_1) corresponding to transmission of timing reference portion 515, and records time t4' (measured with the clock of Device_1) corresponding to reception of an ACK packet 520. In an embodiment, Device_2 records time t2" (measured with the clock of Device_2) corresponding to reception of the timing reference portion 515, and records time t3" (measured with the clock of Device_2) corresponding to transmission of the ACK packet 520.

Figure 6:
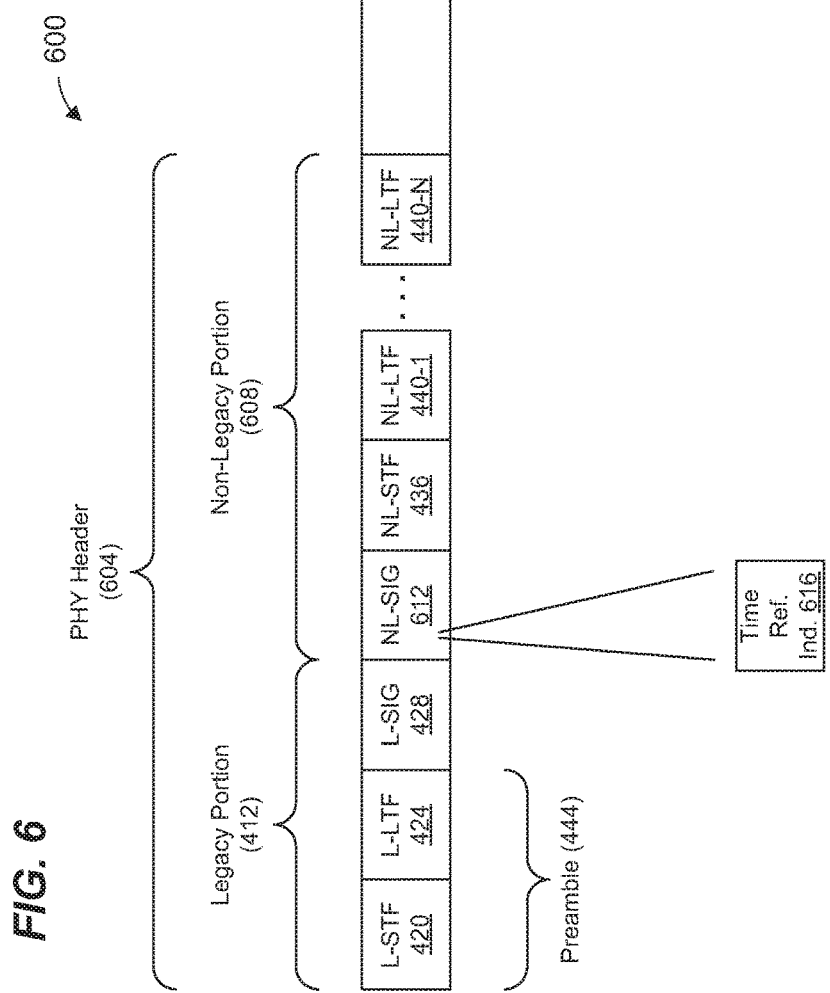
FIG. 6 is a diagram of an example PHY protocol data unit, according to an embodiment of the present disclosure.

FIG. 6 is a diagram of an example PHY data unit 600 in accordance with some embodiments of the present disclosure. In an embodiment, the packet 508 comprising FTM 510 and timing reference portion 515 has the format illustrated in FIG. 6. In other embodiments, however, the packet 508 has another suitable format different than the format illustrated in FIG. 6.

The PHY data unit 600 has a format similar to the PHY prior art data unit 400 of FIG. 4, and like-numbered elements are not described in detail for purposes of brevity. The PHY data unit includes a PHY header 604 having a non-legacy portion 608. The non-legacy portion 608 includes a non-legacy signal field 612, which in turn includes an indicator field 616. The indicator field 616 is used by a transmitter to signal to a receiver whether the PHY data unit 600 includes a timing reference portion 640 at an end of the PHY data unit 600, e.g., after an end of the data portion 408. For example, in an embodiment, the indicator field 616 consists of a bit, where a first value of the bit indicates that the PHY data unit 600 does not include the timing reference portion 640, whereas a second value of the bit indicates that the PHY data unit 600 does include the timing reference portion 640. In other embodiments, the indicator field 616 includes multiple bits. In some embodiments, when the PHY data unit 600 includes the timing reference portion 640, a receiver is configured to record a time of arrival of the timing reference portion 640, as opposed to a time of arrival of the preamble 444, for example. Thus, in some embodiments, the transmitter uses the indicator field 616 to signal to a receiver that the receiver is to record a time of arrival of the timing reference portion 640 at the end of the PHY data unit 600.

In other embodiments, the transmitter signals a presence of the timing reference portion 640 at the end of the PHY data unit 600 using another suitable technique. For example, in some embodiments, the transmitter modulates one or more OFDM symbols in the non-legacy portion with a phase rotation of 90 degrees (e.g., quarternary binary phase shift keying (Q-BPSK)) to signal a presence of the timing reference portion 640 at the end of the PHY data unit 600. In some embodiments, the indicator 616 is included in a control frame included in the PHY data portion 408.

In an embodiment, the timing reference portion 640 includes a reference signal that the receiver is configured to detect for purposes of recording a time of arrival of the timing reference portion 640. In some embodiments, the timing reference portion 640 and/or the reference signal includes one of, or any suitable combination of two or more of, i) a field the same as or similar to the L-STF 420 ii) a field the same as or similar to the L-LTF 424, iii) a field the same as or similar to the L-SIG 428, iv) a field the same as or similar to the NL-SIG 432, v) a field the same as or similar to the NL-STF 426, vi) a field the same as or similar to any of NL-LTF 440, etc. In other embodiments, the timing reference portion 640 includes one or more other suitable fields configured for detection by a receiver for purposes of recording a time of arrival of the timing reference portion 640. In other embodiments, the timing reference portion 640 includes one or more other suitable fields configured for detection by a receiver for purposes of recording ranging information other than a time of arrival of the timing reference portion 640, e.g., angle information, channel state information, etc.

Referring now to FIGS. 3 and 5, the magnitude of the difference t4'-t1' in FIG. 5 is smaller as compared to FIG. 3. Similarly, the magnitude of the difference t3"-t2" in FIG. 5 is smaller as compared to FIG. 3. Thus, the errors Δ1 and Δ2 tend to be smaller using the techniques discussed in connection with FIG. 5 as compared to the techniques discussed in connection with FIG. 3. Accordingly, using the techniques discussed in connection with FIG. 5 provides a more accurate $RTT_{EST}$ as compared to the techniques discussed in connection with FIG. 3, at least in some embodiments and/or scenarios.

Figure 7:
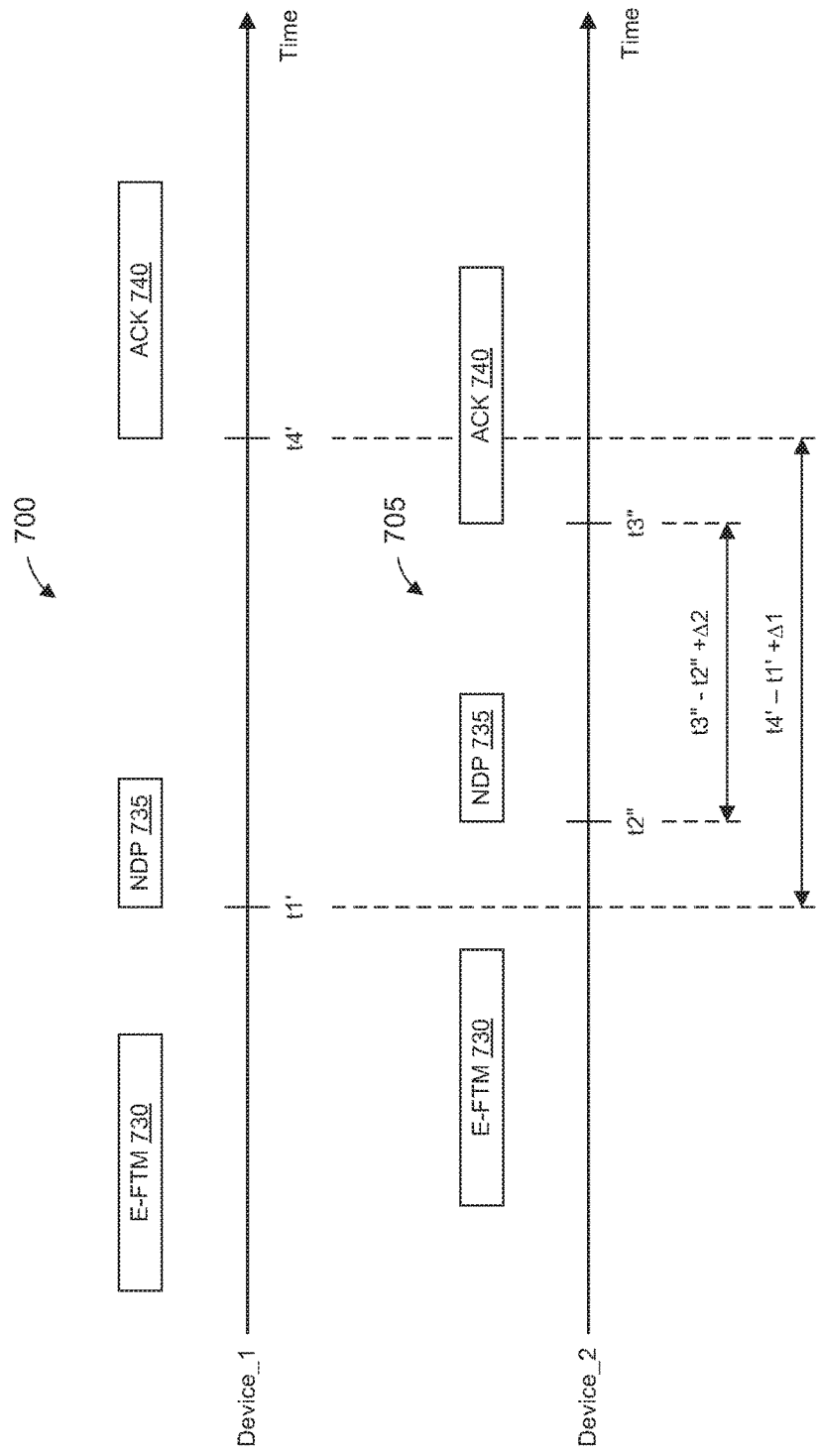
FIG. 7 is a timing diagram of another example range measurement signal exchange, according to an embodiment of the present disclosure.

FIG. 7 includes timing diagrams of an example range measurement signal exchange, according to another embodiment of the present disclosure. Timing diagram 700 is of an example FTM packet/ACK packet exchange with respect to Device_1, and a timing diagram 705 of the same FTM packet/ACK packet exchange with respect to Device_2, according to an embodiment of the present disclosure. In some embodiments, a first packet is an enhanced FTM packet (E-FTM) 730 which is followed by a second packet 735. In an embodiment, the second packet 735 is a null data packet (NDP). In other embodiments, the second packet 735 is another suitable packet that is significantly shorter in duration than the E-FTM packet 730. For example, in various embodiments, the second packet 735 has a duration that is at most one of i) 70%, ii) 60%, iii) 50%, iv) 40%, v) 30%, vi) 20%, etc., of the duration of the E-FTM packet 730.

In an embodiment, the E-FTM packet 730 is configured to signal to a receiver that the second packet 735 will immediately follow the E-FTM packet 730, e.g., the transmitter begins transmitting the second packet 735 a predetermined time period (e.g., SIFS, a reduced interframe space (RIFS) as defined by the IEEE 802.11 Standard, etc.) after an end of the E-FTM packet 730. For example, the E-FTM packet 730 includes a field that indicates that the second packet 735 will begin the predetermined time period after the end of the E-FTM packet 730.

In an embodiment, Device_1 transmits E-FTM packet 730, and then begins transmitting the second packet 735 the predetermined time period (e.g., SIFS, RIFS, etc.) after the end of the E-FTM packet 730. Device_1 records time t1' (measured with the clock of Device_1) corresponding to transmission of the second packet 735, and records time t4' (measured with the clock of Device_1) corresponding to reception of an ACK packet 740.

In response to receiving E-FTM 730, Device 2 determines that the second packet 735 will begin the predetermined time period after the end of E-FTM 730. In an embodiment, Device_2 records time t2" (measured with the clock of Device_2) corresponding to reception of the second packet 735, and records time t3" (measured with the clock of Device_2) corresponding to transmission of the ACK packet 740.

In some embodiments, the second packet 735 has a same bandwidth as the E-FTM packet 730.

Figure 8:
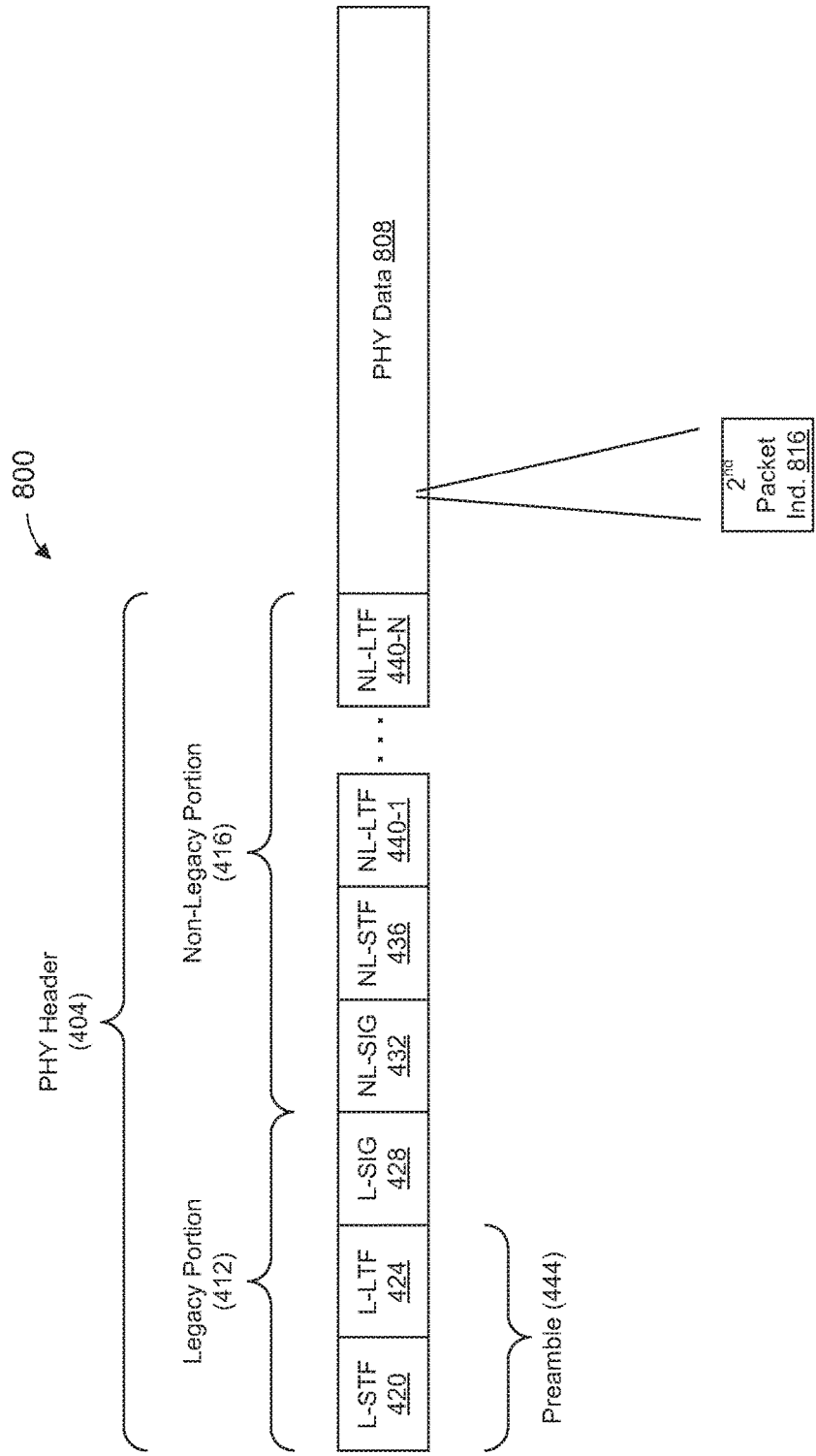
FIG. 8 is a diagram of another example PHY protocol data unit, according to an embodiment of the present disclosure.

FIG. 8 is a diagram of an example PHY data unit 800 in accordance with some embodiments of the present disclosure. In an embodiment, E-FTM packet 730 has the format illustrated in FIG. 8. The PHY data unit 800 has a format similar to the PHY prior art data unit 400 of FIG. 4, and like-numbered elements are not described in detail for purposes of brevity. The PHY data unit 800 includes a PHY data portion 808 having an indicator field 816. The indicator field 816 is used by a transmitter to signal to a receiver whether the second packet 735 begins the predetermined time period after an end of the PHY data unit 800. For example, in an embodiment, the indicator field 816 consists of a bit, where a first value of the bit indicates that second packet 735 begins the predetermined time period after the end of the PHY data unit 800, whereas a second value of the bit indicates that the transmitter will not transmit the second packet 735. In other embodiments, the indicator field 816 includes multiple bits.

In some embodiments, when the transmitter transmits the second packet 735, which begins the predetermined time period after the end of the PHY data unit 800, a receiver is configured to record a time of arrival of the second packet 735, as opposed to a time of arrival of the packet 800, for example. Thus, in some embodiments, the transmitter uses the indicator field 816 to signal to a receiver that the receiver is to record a time of arrival of the second packet 735 that follows the PHY data unit 800.

In other embodiments, the transmitter signals that the second packet 735 will follow the PHY data unit 800 using another suitable technique. For example, in some embodiments, the transmitter modulates one or more OFDM symbols in the non-legacy portion 416 with a phase rotation of 90 degrees (e.g., quarternary binary phase shift keying (Q-BPSK)) to signal that the second packet 735 will follow the packer 800. In some embodiments, the indicator 816 is included in the NL-SIG field 432, or in another suitable field in the PHY header 404.

Referring now to FIGS. 3 and 7, the magnitude of the difference t4'-t1' in FIG. 5 is smaller as compared to FIG. 3 because the duration of the second packet 735 is significantly smaller than the duration of E-FTM 730. Similarly, the magnitude of the difference t3"-t2" in FIG. 7 is smaller as compared to FIG. 3. Thus, the errors 41 and 42 tend to be smaller using the techniques discussed in connection with FIG. 7 as compared to the techniques discussed in connection with FIG. 3. Accordingly, using the techniques discussed in connection with FIG. 7 provides a more accurate $RTT_{EST}$ as compared to the techniques discussed in connection with FIG. 3, at least in some embodiments and/or scenarios.

Figure 9:
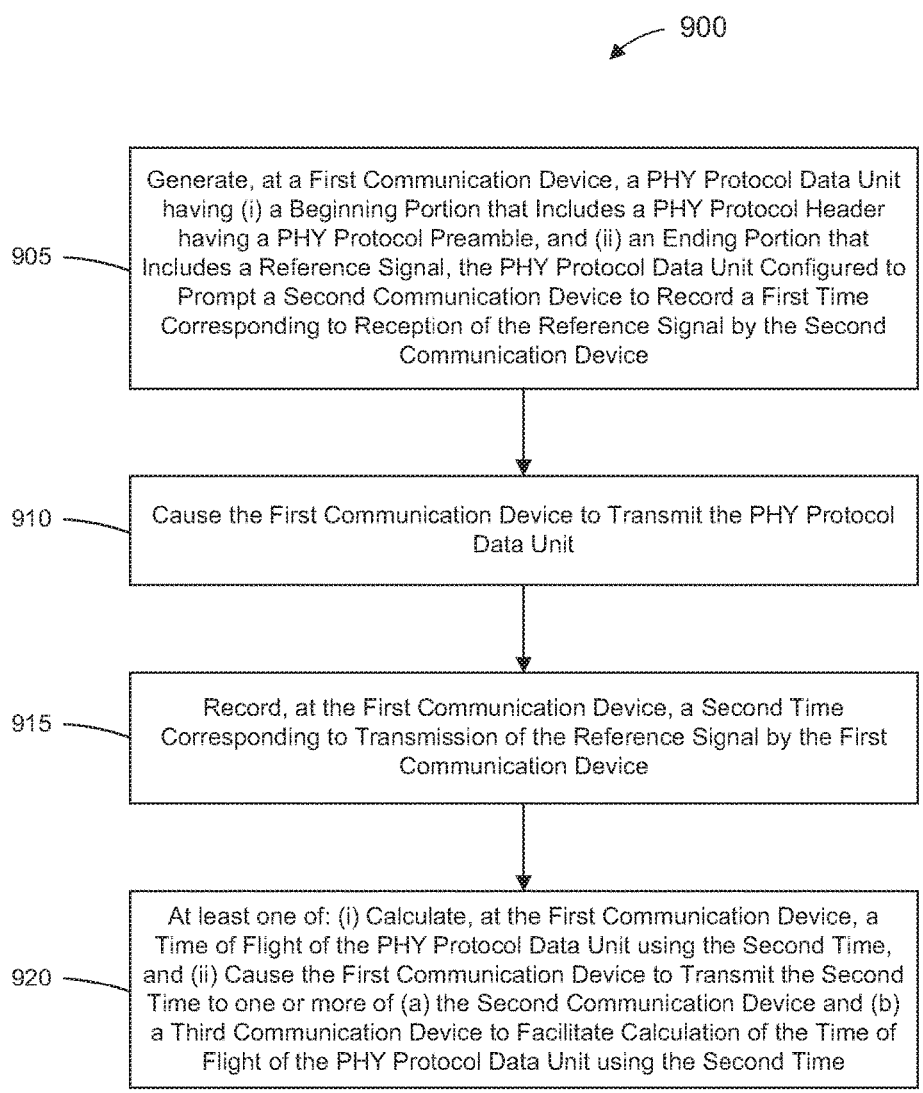
FIG. 9 is a flow diagram of an example method for facilitating time of flight measurements in a communication network, according to an embodiment of the present disclosure.

FIG. 9 is an example method 900 for facilitating time of flight measurements in a communication network, in accordance with one or more embodiments. In some embodiments, the method 900 is implemented by an access point (e.g., AP 14-1 as shown in FIG. 1). As an example, the network interface 16 is configured to implement the method 900, according to an embodiment. For instance, the MAC processor 18 is configured to implement at least a portion of the method 900, according to an embodiment. Similarly, the PHY processor 20 is configured to implement at least a portion of the method 900, according to an embodiment. As another example, the MAC processor 18 is configured to implement a first portion of the method 900, and the PHY processor 20 is configured to implement a second portion of the method 900, according to an embodiment.

In other embodiments, the method 900 is implemented by a client station (e.g., client station 25-1 as shown in FIG. 1). As an example, the network interface 27 is configured to implement the method 900, according to an embodiment. For instance, the MAC processor 28 is configured to implement at least a portion of the method 900, according to an embodiment. Similarly, the PHY processor 29 is configured to implement at least a portion of the method 900, according to an embodiment. As another example, the MAC processor 28 is configured to implement a first portion of the method 900, and the PHY processor 29 is configured to implement a second portion of the method 900, according to an embodiment.

In other embodiments, the method 900 is implemented by another suitable communication device.

At block 905, a first communication device (e.g., a client station, an AP, etc.) generates a PHY protocol data unit that has a beginning portion and an ending portion. In one embodiment, the PHY protocol data unit generated at block 905 is the packet comprising FTM 510 and REF SIG 515 (FIG. 5), where the beginning portion includes FTM 510 and the ending portion includes timing reference portion 515. In some embodiments, a PHY protocol data unit is generated that has a beginning portion that includes a PHY protocol header having a PHY protocol preamble. In some embodiments, the ending portion includes a reference signal. In some embodiments, the PHY protocol data unit generated at block 905 has a format the same as or similar to the format of the example PHY data unit 600 illustrated in FIG. 6.

In accordance with one or more embodiments, the PHY protocol data unit generated at block 905 is configured to prompt a second communication device (e.g., a client station, an AP, etc.) to record a first time or other ranging information corresponding to reception of the reference signal in the ending portion by the second communication device. For example, in an embodiment, the second communication device is prompted to record the reception time of the reference signal included in the ending portion of the PHY protocol data unit generated at the first communication device. In some embodiments, the second communication device is prompted to record a time corresponding to reception of the reference signal at the second communication device, where the reception time is measured with a clock of the second communication device. In an embodiment, the first time corresponding to reception of the reference signal by the second communication device is time t2", which corresponds to reception of the timing reference portion 515 by Device_2 in the example timing diagram 505 shown in FIG. 5.

In some embodiments, the second communication device is prompted to record the reception time of the reference signal or other ranging information based on information that signals to the second communication device that the ending portion of the PHY protocol data unit includes the reference signal. For example, in an embodiment, a beginning portion of the PHY data unit includes the information that signals to the second communication device that the ending portion of the PHY protocol data unit includes the reference signal. In at least one embodiment, the information is included in a PHY protocol header of the PHY protocol data unit (e.g., Indicator 616 included in PHY protocol header 604 of the example PHY data unit 600 shown in FIG. 6).

At block 910, the first communication device is caused to transmit the PHY protocol data unit generated block 905. In some embodiments, block 910 includes circuitry, a processor executing software, etc., in the network interface device (e.g., in a MAC processor, in a PHY processor, etc.) prompting the network interface device to transmit the PHY protocol data unit.

At block 915, a second time corresponding to transmission of the reference signal by the first communication device is recorded at the first communication device. For example, in an embodiment, the first communication device records the transmission time of the reference signal included in the ending portion of the PHY protocol data unit generated at block 905. In some embodiments, where the first communication device records the time corresponding to transmission of the reference signal by the first communication device, the transmission time is measured with a clock of the first communication device. In an embodiment, the second time corresponding to transmission of the reference signal by the first communication device is time t1", which corresponds to transmission of timing reference portion 515 by Device_1 in the example timing diagram 500 shown in FIG. 5.

At block 920, at least one of two actions or operations occurs. In some embodiments, at block 920, a time of flight of the PHY protocol data unit (that is caused to be transmitted at block 910) is calculated at the first communication device. For example, in an embodiment, the time of flight is calculated by the first communication device using the second time recorded by the first communication device at block 915, where the second time corresponds to transmission of the reference signal by the first communication device.

In some embodiments, at block 920, the first communication device is caused (e.g., by circuitry, a processor executing software, etc., in the network interface device) to transmit the second time recorded at block 915 (which corresponds to transmission of the reference signal by the first communication device) to the second communication device, to a third communication device (e.g., a client station, an AP, etc.), or to both the second communication and the third communication device, to facilitate calculation of the time of flight of the PHY protocol data unit using the second time. For example, in an embodiment, the communication device that records the transmission time corresponding to the transmission of the reference signal (e.g., at block 915) is also the device that calculates the time of flight of the PHY protocol data unit using the second time. In another embodiment, the communication device that records the transmission time corresponding to the transmission of the reference signal (e.g., at block 915) is not the device that calculates the time of flight of the PHY protocol data unit. For example, in an embodiment, the communication device that records the time corresponding to transmission of the reference signal is caused (by circuitry, a processor executing software, etc., in the network interface device) to transmit the recorded transmission time to another communication device for calculation of the time of flight of the PHY protocol data unit. In such an embodiment, block 920 includes circuitry, a processor executing software, etc., in the network interface device (e.g., in a MAC processor, in a PHY processor, etc.) of the first communication device prompting the network interface device to transmit the second time to the second communication device, to a third communication device, or to both the second communication device and the third communication device.

In some embodiments, at block 920, the first communication device calculates a time of flight of the PHY protocol data unit using the second time, and the first communication device is also caused (by circuitry, a processor executing software, etc., in the network interface device) to transmit the second time to the second communication device and/or third communication device. In one or more other embodiments, at block 920, the first communication device calculates a time of flight of the PHY protocol data unit using the second time, but the first communication device is not caused to transmit the second time to the second communication device and/or third communication device. In one or more other embodiments, at block 920, the first communication device is caused to transmit the second time to the second communication device and/or third communication device, but the first communication device does not calculate the time of flight of the PHY protocol data unit using the second time.

In some embodiments, the first communication device receives the first time corresponding to reception of the reference signal (e.g., transmitted at block 910) by the second communication device. In such embodiments, the first communication device calculates the time of flight of the PHY protocol data unit using the first time and the second time (where the second time corresponds to transmission of the reference signal by the first communication device, which is recorded at block 915). For example, referring to FIG. 5, the second time is included in the ACK 520, or in a subsequent packet from the second communication device.

In some embodiments, the method 900 further includes the first communication device receiving a second PHY protocol data unit from the second communication device, the second PHY protocol data unit responsive to the PHY protocol data unit transmitted at block 910. In some embodiments, the second PHY protocol data unit was transmitted by the second communication device at a third time. In some embodiments, the method 900 further includes the first communication device recording a fourth time at which the first communication device receives the second PHY protocol data unit.

In some embodiments, the method 900 includes calculating a round trip time using the first time, the second time, the third time, and the fourth time. In some embodiments, a device that calculates the round trip time receives any of the first time, the second time, the third time, and the fourth time, which were not recorded by the device, from one or more other devices.

Figure 10:
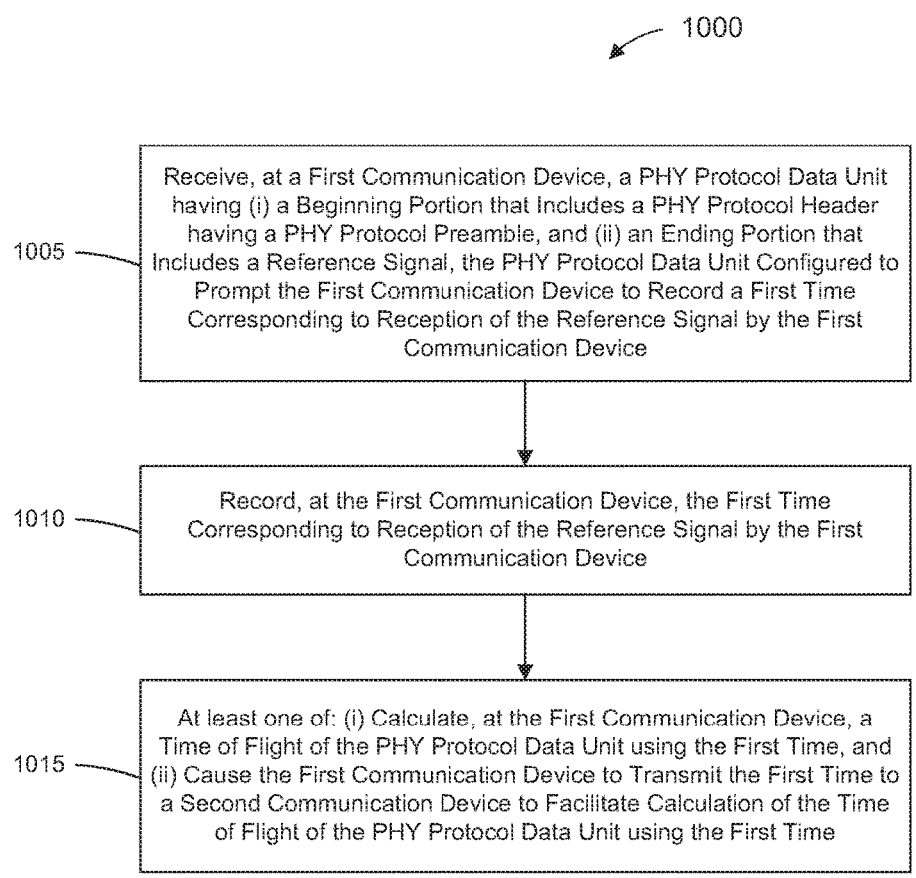
FIG. 10 is a flow diagram of another example method for facilitating time of flight measurements in a communication network, according to an embodiment of the present disclosure.

FIG. 10 is an example method 1000 for facilitating time of flight measurements in a communication network, in accordance with one or more embodiments. In some embodiments, the method 1000 is implemented by an access point (e.g., AP 14-1 as shown in FIG. 1). As an example, the network interface 16 is configured to implement the method 1000, according to an embodiment. For instance, the MAC processor 18 is configured to implement at least a portion of the method 1000, according to an embodiment. Similarly, the PHY processor 20 is configured to implement at least a portion of the method 1000, according to an embodiment. As another example, the MAC processor 18 is configured to implement a first portion of the method 1000, and the PHY processor 20 is configured to implement a second portion of the method 1000, according to an embodiment.

In other embodiments, the method 1000 is implemented by a client station (e.g., client station 25-1 as shown in FIG. 1). As an example, the network interface 27 is configured to implement the method 1000, according to an embodiment. For instance, the MAC processor 28 is configured to implement at least a portion of the method 1000, according to an embodiment. Similarly, the PHY processor 29 is configured to implement at least a portion of the method 1000, according to an embodiment. As another example, the MAC processor 28 is configured to implement a first portion of the method 1000, and the PHY processor 29 is configured to implement a second portion of the method 1000, according to an embodiment.

In other embodiments, the method 1000 is implemented by another suitable communication device.

At block 1005, a first communication device (e.g., a client station, an AP, etc.) receives a PHY protocol data unit that has a beginning portion and an ending portion. In one embodiment, the PHY protocol data unit received at block 1005 is the example packet 508 comprising FTM 510 and timing reference portion 515 (FIG. 5), where the beginning portion includes FTM 510 and the ending portion includes the timing reference portion 515. In some embodiments, a PHY protocol data unit is received that has a beginning portion that includes a PHY protocol header having a PHY protocol preamble. In some embodiments, the PHY protocol data unit received at block 1005 has a format the same as or similar to the format of example PHY data unit 600 illustrated in FIG. 6. For example, in an embodiment, the PHY protocol data unit has a beginning portion that includes a PHY protocol header having a PHY protocol preamble and an Indicator (e.g., PHY protocol header 605 that has PHY protocol preamble 620 and Indicator 616, as shown in the example PHY data unit 600 of FIG. 6). In accordance with at least one embodiment, a PHY protocol data unit is received that has an ending portion that includes a reference signal (e.g., in the timing reference portion 640 of the example PHY data unit 600 shown in FIG. 6).

In accordance with one or more embodiments, the PHY protocol data unit received at block 1005 is configured to prompt the first communication device to record a first time corresponding to reception of the reference signal by the first communication device. For example, in an embodiment, the first communication device is prompted to record the reception time of the reference signal included in the ending portion of the PHY protocol data unit received at block 1005. In some embodiments, the first communication device is prompted to record a time corresponding to reception of the reference signal at the first communication device, where the reception time is measured with a clock of the first communication device. In an embodiment, the first time corresponding to reception of the reference signal by the first communication device is time t2", which corresponds to reception of reference portion 515 by Device_2 in the example timing diagram 505 shown in FIG. 5.

In some embodiments, the first communication device determines that the reference signal is included in the ending portion of the PHY protocol data unit using information in the PHY protocol header of the PHY protocol data unit. For example, in an embodiment, the first communication devices determines that an ending portion of the PHY protocol data unit received at block 1005 includes the reference signal based on information included in a beginning portion of the received PHY protocol data unit. In at least one embodiment, the information is included in a PHY protocol header of the PHY protocol data unit (e.g., Indicator 616 included in PHY protocol header 605 of the example PHY data unit 600 shown in FIG. 6).

At block 1010, the first communication device records the first time corresponding to reception of the reference signal by the first communication device. For example, in an embodiment, the first communication device records the reception time of the reference signal included in the ending portion of the PHY protocol data unit received at block 1005. In some embodiments, where the first communication device records the time corresponding to reception of the reference signal by the first communication device, the reception time is measured with a clock of the first communication device.

At block 1015, at least one of two actions or operations occurs. In some embodiments, at block 1015, a time of flight of the PHY protocol data unit (that is received by the first communication device at block 1005) is calculated by the first communication device. For example, in an embodiment, the time of flight is calculated by the first communication device using the first time recorded by the first communication device at block 1010, where the first time corresponds to reception of the reference signal by the first communication device.

In some embodiments, at block 1015, the first communication device is caused (e.g., by circuitry, a processor executing software, etc.) to transmit the first time recorded at block 1010 (which corresponds to reception of the reference signal by the first communication device) to a second communication device (e.g., the device that transmitted the PHY protocol data unit received at block 1005) or a third communication device to facilitate calculation of the time of flight of the PHY protocol data unit using the first time. For example, in an embodiment, the communication device that records the reception time corresponding to reception of the reference signal (e.g., at block 1010) is also the device that calculates the time of flight of the PHY protocol data unit using the first time. In another embodiment, the communication device that records the reception time corresponding to reception of the reference signal (e.g., at block 1010) is not the device that calculates the time of flight of the PHY protocol data unit. For example, in an embodiment, the communication device that records the time corresponding to reception of the reference signal is caused (e.g., by circuitry, a processor executing software, etc.) to transmit the recorded reception time to another communication device for calculation of the time of flight of the PHY protocol data unit. In such an embodiment, block 1015 includes circuitry, a processor, etc., in the network interface device (e.g., in a MAC processor, in a PHY processor, etc.) of the first communication device prompting the network interface device to transmit the first time to the second communication device.

In some embodiments, at block 1015, the first communication device calculates a time of flight of the PHY protocol data unit using the first time, and the first communication device is also caused to transmit the first time to a second communication device (e.g., a client station, an AP, etc.). In one or more other embodiments, at block 1015, the first communication device calculates a time of flight of the PHY protocol data unit using the first time, but the first communication device is not caused to transmit the first time to the second communication device. In one or more other embodiments, at block 1015, the first communication device is caused to transmit the first time to the second communication device, but the first communication device does not calculate the time of flight of the PHY protocol data unit using the first time.

In some embodiments, the first communication device receives a second time corresponding to transmission of the reference signal (e.g., included in the PHY protocol data united received at block 1005 or in a subsequent PHY protocol unit) by the second communication device (e.g., a client station, an AP, etc.). In such embodiments, the first communication device calculates the time of flight of the PHY protocol data unit using the first time and the second time (where the first time corresponds to reception of the reference signal by the first communication device, which is recorded at block 1010).

In some embodiments, the method 1000 further includes the first communication device transmitting a second PHY protocol data unit to the second communication device, the second PHY protocol data unit responsive to the PHY protocol data unit received at block 1005. In some embodiments, the second PHY protocol data unit is transmitted by the first communication device at a third time. In some embodiments, the method 1000 further includes the first communication device recording the third time at which the first communication device transmitted the second PHY protocol data unit. The second communication receives the second PHY protocol data unit at a fourth time.

In some embodiments, the method 1000 includes calculating a round trip time using the first time, the second time, the third time, and the fourth time. In some embodiments, a device that calculates the round trip time receives any of the first time, the second time, the third time, and the fourth time, which were not recorded by the device, from one or more other devices.

As compared to existing approaches for calculating time of flight measurements, where the relevant time that is recorded is the reception time of a beginning of the transmitted packet (e.g., time t2" corresponding to reception of a beginning portion of FTM 312 by Device_2 in the example timing diagram 304 shown in FIG. 3), in accordance with at least some embodiments of the present disclosure, the relevant time that is recorded is the reception time of some point at or near an end of the packet (e.g., time t2" corresponding to reception of reference portion 515 by Device_2 as shown in the example timing diagram 505 of FIG. 5).

Figure 11:
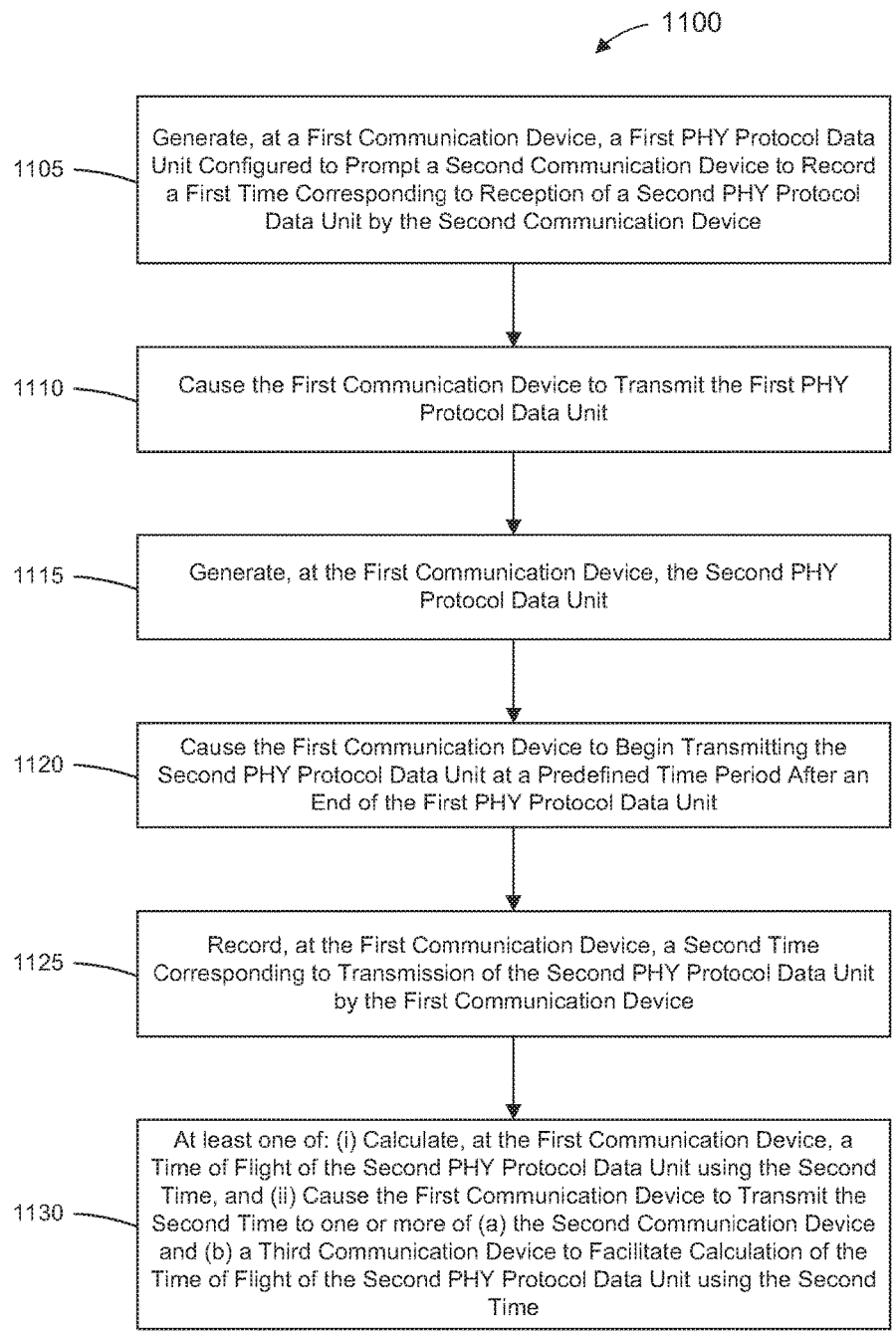
FIG. 11 is a flow diagram of another example method for facilitating time of flight measurements in a communication network, according to an embodiment of the present disclosure.

FIG. 11 is an example method 1100 for facilitating time of flight measurements in a communication network, in accordance with one or more embodiments. In some embodiments, the method 1100 is implemented by an access point (e.g., AP 14-1 as shown in FIG. 1). As an example, the network interface 16 is configured to implement the method 1100, according to an embodiment. For instance, the MAC processor 18 is configured to implement at least a portion of the method 1100, according to an embodiment. Similarly, the PHY processor 20 is configured to implement at least a portion of the method 1100, according to an embodiment. As another example, the MAC processor 18 is configured to implement a first portion of the method 1100, and the PHY processor 20 is configured to implement a second portion of the method 1100, according to an embodiment.

In other embodiments, the method 1100 is implemented by a client station (e.g., client station 25-1 as shown in FIG. 1). As an example, the network interface 27 is configured to implement the method 1100, according to an embodiment. For instance, the MAC processor 28 is configured to implement at least a portion of the method 1100, according to an embodiment. Similarly, the PHY processor 29 is configured to implement at least a portion of the method 1100, according to an embodiment. As another example, the MAC processor 28 is configured to implement a first portion of the method 1100, and the PHY processor 29 is configured to implement a second portion of the method 1100, according to an embodiment.

In other embodiments, the method 1100 is implemented by another suitable communication device.

At block 1105, a first communication device (e.g., a client station, an AP, etc.) generates a first PHY protocol data unit. In one embodiment, the first PHY protocol data unit generated at block 1105 is E-FTM 730 (FIG. 7). In some embodiments, the first PHY protocol data unit generated is a timing measurement frame (e.g., action frame) that indicates a second PHY protocol data unit (e.g., a NDP packet or another suitable packet) will follow the first PHY protocol data unit after a predetermined time period (e.g., SIFS). In some embodiments, the first PHY protocol data unit generated at block 1105 has a format the same as or similar to the format of example PHY data unit 800 illustrated in FIG. 8. For example, in an embodiment, the first PHY protocol data unit has a PHY protocol header having a PHY protocol preamble and an Indicator 816.

In accordance with one or more embodiments, the first PHY protocol data unit generated at block 1105 is configured to prompt a second communication device (e.g., a client station, an AP, etc.) to record a first time corresponding to reception of the second PHY protocol data unit by the second communication device. In some embodiments, the second communication device is prompted to record a time corresponding to reception of the second PHY protocol data unit by the second communication device, where the reception time is measured with a clock of the second communication device. In an embodiment, the first time corresponding to reception of the second PHY protocol data unit by the second communication device is time t2", which corresponds to reception of NDP 735 by Device_2 in the example timing diagram 705 shown in FIG. 7.

In some embodiments, the second communication device is prompted to record the reception time of the second PHY protocol data unit based on information that signals to the second communication device that the second PHY protocol data unit will follow the transmission of the first PHY protocol data unit at a predefined time period after the end of the first PHY protocol data unit. For example, in an embodiment, a PHY protocol header of the first PHY protocol data unit includes the information that signals to the second communication device that the second PHY protocol data unit will follow the transmission of the first PHY protocol data unit at a predefined time period after the end of the first PHY protocol data unit. In another embodiment, a PHY data portion of the first PHY protocol data unit includes the information that signals to the second communication device that the second PHY protocol data unit will follow the transmission of the first PHY protocol data unit at a predefined time period after the end of the first PHY protocol data unit.

At block 1110, the first communication device is caused (e.g., by circuitry, a processor executing software, etc.) to transmit the first PHY protocol data unit generated block 1105. In some embodiments, block 1110 includes circuitry, a processor, etc., in the network interface device (e.g., in a MAC processor, in a PHY processor, etc.) of the first communication device prompting the network interface device to transmit the first PHY protocol data unit.

At block 1115, the first communication device generates the second PHY protocol data unit. In one embodiment, the second PHY protocol data unit generated at block 1115 is an NDP. In other embodiments, the second PHY protocol data unit is another suitable PHY protocol data unit having a duration that is significantly shorter than a duration of the first PHY protocol data unit.

At block 1120, the first communication device is caused (e.g., by circuitry, a processor executing software, etc.) to begin transmitting the second PHY protocol data unit generated block 1115. In some embodiments, the first communication device is caused to begin transmitting the second PHY protocol data unit at a predefined time period after an end of the first PHY protocol data unit. For example, in an embodiment, the predefined time period corresponds to an inter-frame space (e.g., SIFS) that follows the end of the first PHY protocol data unit. In some embodiments, block 1120 includes circuitry, a processor, etc., in the network interface device (e.g., in a MAC processor, in a PHY processor, etc.) of the first communication device prompting the network interface device to begin to transmit the second PHY protocol data unit.

At block 1125, a second time corresponding to transmission of the second PHY protocol data unit by the first communication device is recorded at the first communication device. For example, in an embodiment, the first communication device records the transmission time of the second PHY protocol data unit transmitted by the first communication device at a predefined time period after transmission of the end of the first PHY protocol data unit by the first communication device. In some embodiments, where the first communication device records the time corresponding to transmission of the second PHY protocol data unit by the first communication device, the transmission time is measured with a clock of the first communication device. In an embodiment, the second time corresponding to transmission of the second PHY protocol data unit by the first communication device is time t1″, which corresponds to transmission of the second packet 735 by Device_1 in the example timing diagram 700 shown in FIG. 7.

At block 1130, at least one of two actions or operations occurs. In some embodiments, at block 1130, a time of flight of the second PHY protocol data unit (that is caused to be transmitted at block 1120) is calculated at the first communication device. For example, in an embodiment, the time of flight of the second PHY protocol data unit is calculated by the first communication device using the second time recorded by the first communication device at block 1125, where the second time corresponds to transmission of the second PHY protocol data unit by the first communication device.

In some embodiments, at block 1130, the first communication device is caused to transmit the second time recorded at block 1125 (which corresponds to transmission of the second PHY protocol data by the first communication device) to the second communication device, to a third communication device (e.g., a client station, an AP, etc.), or to both the second communication and the third communication device, to facilitate calculation of the time of flight of the second PHY protocol data unit using the second time. For example, in an embodiment, the communication device that records the transmission time corresponding to transmission of the second PHY protocol data (e.g., at block 1125) is also the device that calculates the time of flight of the second PHY protocol data unit using the second time. In another embodiment, the communication device that records the transmission time corresponding to transmission of the second PHY protocol data (e.g., at block 1125) is not the device that calculates the time of flight of the second PHY protocol data unit. For example, in an embodiment, the communication device that records the time corresponding to transmission of the second PHY protocol data is caused to transmit the recorded transmission time to another communication device for calculation of the time of flight of the second PHY protocol data unit. In such an embodiment, block 1130 includes circuitry, a processor, etc., in the network interface device (e.g., in a MAC processor, in a PHY processor, etc.) of the first communication device prompting the network interface device to transmit the second time to the second communication device, to a third communication device, or to both the second communication device and the third communication device.

In some embodiments, at block 1130, the first communication device calculates a time of flight of the second PHY protocol data unit using the second time, and the first communication device is also caused to transmit the second time to the second communication device and/or third communication device. In one or more other embodiments, at block 1130, the first communication device calculates a time of flight of the second PHY protocol data unit using the second time, but the first communication device is not caused to transmit the second time to the second communication device and/or third communication device. In one or more other embodiments, at block 1130, the first communication device is caused to transmit the second time to the second communication device and/or third communication device, but the first communication device does not calculate the time of flight of the second PHY protocol data unit using the second time.

In some embodiments, the first communication device receives the first time corresponding to reception of the second PHY protocol data (e.g., transmitted by the first communication device at block 1120) by the second communication device. In such embodiments, the first communication device calculates the time of flight of the second PHY protocol data unit using the first time and the second time (where the second time corresponds to transmission of the second PHY protocol data by the first communication device, which is recorded at block 1125).

In some embodiments, the method 1100 further includes the first communication device receiving a third PHY protocol data unit from the second communication device, the third PHY protocol data unit responsive to the first PHY protocol data unit transmitted at block 1110 and/or the second PHY protocol data unit transmitted at block 1120. In some embodiments, the third PHY protocol data unit is transmitted by the second communication device at a third time. In some embodiments, the method 1100 further includes the first communication device recording a fourth time at which the first communication device receives the third PHY protocol data unit.

In some embodiments, the method 1100 includes calculating a round trip time using the first time, the second time, the third time, and the fourth time. In some embodiments, a device that calculates the round trip time receives any of the first time, the second time, the third time, and the fourth time, which were not recorded by the device, from one or more other devices.

Figure 12:
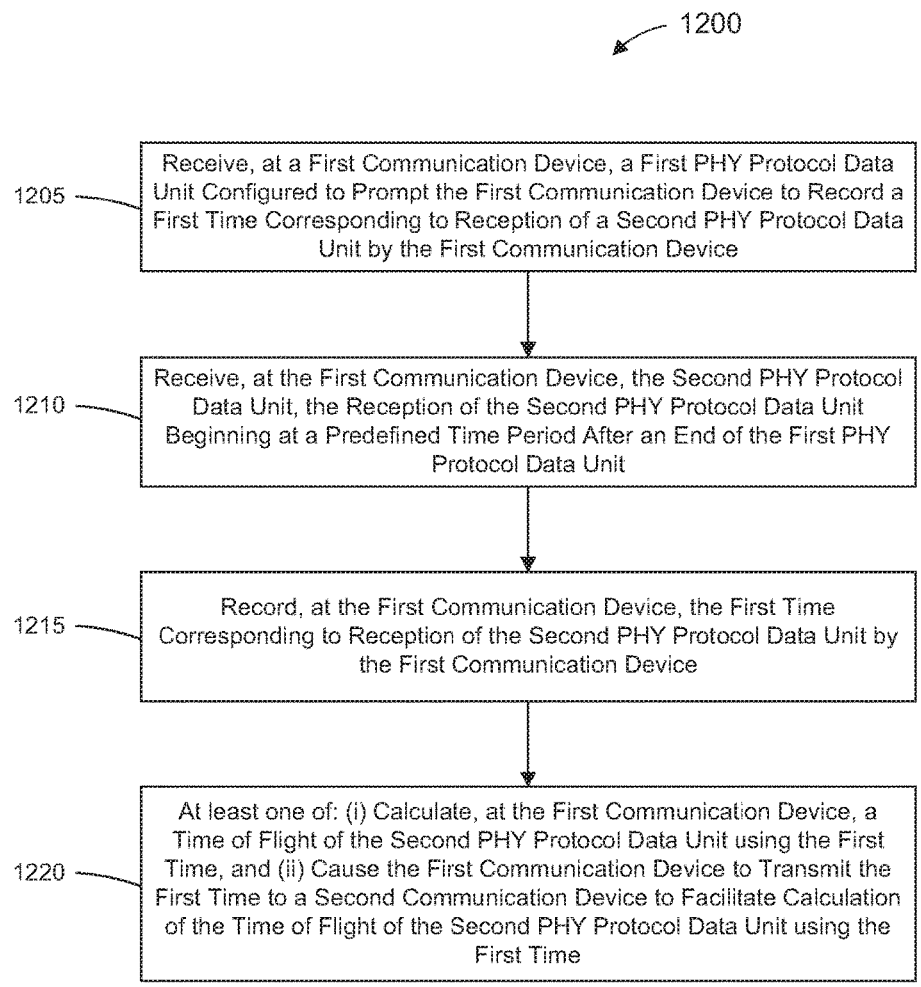
FIG. 12 is a flow diagram of another example method for facilitating time of flight measurements in a communication network, according to an embodiment of the present disclosure.

FIG. 12 is an example method 1200 for facilitating time of flight measurements in a communication network, in accordance with one or more embodiments. In some embodiments, the method 1200 is implemented by an access point (e.g., AP 14-1 as shown in FIG. 1). As an example, the network interface 16 is configured to implement the method 1200, according to an embodiment. For instance, the MAC processor 18 is configured to implement at least a portion of the method 1200, according to an embodiment. Similarly, the PHY processor 20 is configured to implement at least a portion of the method 1200, according to an embodiment. As another example, the MAC processor 18 is configured to implement a first portion of the method 1200, and the PHY processor 20 is configured to implement a second portion of the method 1200, according to an embodiment.

In other embodiments, the method 1200 is implemented by a client station (e.g., client station 25-1 as shown in FIG. 1). As an example, the network interface 27 is configured to implement the method 1200, according to an embodiment. For instance, the MAC processor 28 is configured to implement at least a portion of the method 1200, according to an embodiment. Similarly, the PHY processor 29 is configured to implement at least a portion of the method 1200, according to an embodiment. As another example, the MAC processor 28 is configured to implement a first portion of the method 1200, and the PHY processor 29 is configured to implement a second portion of the method 1200, according to an embodiment.

In other embodiments, the method 1200 is implemented by another suitable communication device.

At block 1205, a first communication device (e.g., a client station, an AP, etc.) receives a first PHY protocol data unit. In one embodiment, the first PHY protocol data unit received at block 1205 is E-FTM 730 (FIG. 7). In some embodiments, the first PHY protocol data unit received is a timing measurement frame (e.g., action frame) that indicates second PHY protocol data unit will follow the first PHY protocol data unit with an inter-frame space (e.g., SIFS). In some embodiments, the first PHY protocol data unit received at block 1205 has a format the same as or similar to the format of example PHY data unit 800 illustrated in FIG. 8. For example, in an embodiment, the first PHY protocol data unit has a PHY protocol header includes the indicator 816 as illustrated in FIG. 6.

In accordance with one or more embodiments, the first PHY protocol data unit received by the first communication device at block 1205 is configured to prompt the first communication device to record a first time corresponding to reception of a second PHY protocol data unit by the first communication device. For example, in an embodiment, the first communication device is prompted to record the reception time of a second PHY protocol data unit received at the first communication device following the reception of the first PHY protocol data unit by the first communication device. In some embodiments, the first communication device is prompted to record the first time corresponding to reception of the second PHY protocol data unit by the first communication device, where the reception time is measured with a clock of the first communication device. In an embodiment, the first time corresponding to reception of the second PHY protocol data unit by the first communication device is time t2", which corresponds to reception of NDP 735 by Device_2 in the example timing diagram 705 shown in FIG. 7.

In some embodiments, the first communication device is prompted to record the reception time of the second PHY protocol data unit based on information in the first PHY protocol data unit that signals to the first communication device that the second PHY protocol data unit will follow the first PHY protocol data unit at a predefined time period after the end of the first PHY protocol data unit. For example, in an embodiment, a PHY protocol header of the first PHY protocol data unit includes the information that signals to the first communication device that the second PHY protocol data unit will follow the first PHY protocol data unit at a predefined time period after the end of the first PHY protocol data unit. In another embodiment, the indicator is included in a PHY payload of the first PHY protocol data unit.

At block 1210, the first communication device receives the second PHY protocol data unit. In one embodiment, the second PHY protocol data unit received at block 1210 is a null data packet. In other embodiments, the second PHY protocol data unit is another suitable type of PHY data unit having a duration that is significantly shorter than a duration of the first PHY protocol data unit. In some embodiments, the first communication device begins to receive the second PHY protocol data unit at a predefined time period after reception of an end of the first PHY protocol data unit by the first communication device. For example, in an embodiment, the predefined time period corresponds to an inter-frame space (e.g., SIFS) that follows the end of the first PHY protocol data unit received by the first communication device.

At block 1215, the first communication device records the first time corresponding to reception of the second PHY protocol data unit by the first communication device. In some embodiments, where the first communication device records the time corresponding to reception of the second PHY protocol data unit by the first communication device, the reception time is measured with a clock of the first communication device. For example, in an embodiment, the first time corresponding to reception of the second PHY protocol data unit by the first communication device is time t2", which corresponds to reception of the second PHY protocol data unit 735 by Device_2 in the example timing diagram 705 shown in FIG. 7.

At block 1220, at least one of two actions or operations occurs. In some embodiments, at block 1220, a time of flight of the second PHY protocol data unit (that is received by the first communication device at block 1210) is calculated by the first communication device. For example, in an embodiment, the time of flight is calculated by the first communication device using the first time recorded by the first communication device at block 1215, where the first time corresponds to reception of the second PHY protocol data unit by the first communication device.

In some embodiments, at block 1220, the first communication device is caused to transmit the first time recorded at block 1010 (which corresponds to reception of the reference signal by the first communication device) to a second communication device (e.g., a client station, an AP, etc.) to facilitate calculation of the time of flight of the second PHY protocol data unit using the first time. For example, in an embodiment, the communication device that records the reception time corresponding to reception of the second PHY protocol data (e.g., at block 1215) is also the device that calculates the time of flight of the second PHY protocol data unit using the first time. In another embodiment, the communication device that records the reception time corresponding to reception of the second PHY protocol data (e.g., at block 1215) is not the device that calculates the time of flight of the second PHY protocol data unit. For example, in an embodiment, the communication device that records the time corresponding to reception of the second PHY protocol data is caused to transmit the recorded reception time to another communication device for calculation of the time of flight of the second PHY protocol data unit. In such an embodiment, block 1220 includes circuitry, a processor, etc., in the network interface device (e.g., in a MAC processor, in a PHY processor, etc.) of the first communication device prompting the network interface device to transmit the first time to the second communication device.

In some embodiments, at block 1220, the first communication device calculates a time of flight of the second PHY protocol data unit using the first time, and the first communication device is also caused to transmit the first time to a second communication device (e.g., a client station, an AP, etc.). In one or more other embodiments, at block 1220, the first communication device calculates a time of flight of the second PHY protocol data unit using the first time, but the first communication device is not caused to transmit the first time to the second communication device. In one or more other embodiments, at block 1220, the first communication device is caused to transmit the first time to the second communication device, but the first communication device does not calculate the time of flight of the second PHY protocol data unit using the first time.

In some embodiments, the first communication device receives a second time corresponding to transmission of the second PHY protocol data by a second communication device (e.g., a client station, an AP, etc.). In such embodiments, the first communication device calculates the time of flight of the second PHY protocol data unit using the first time and the second time (where the first time corresponds to reception of the second PHY protocol data by the first communication device, which is recorded at block 1215).

In some embodiments, the method 1200 further includes the first communication device transmitting a third PHY protocol data unit to the second communication device, the third PHY protocol data unit responsive to the first PHY protocol data unit received at block 1205 and/or the second PHY protocol data unit received at block 1210. In some embodiments, the third PHY protocol data unit is transmitted by the first communication device at a third time. In some embodiments, the method 1200 further includes the first communication device recording the third time at which the first communication device transmitted the third PHY protocol data unit. The second communication receives the third PHY protocol data unit at a fourth time.

In some embodiments, the method 1200 includes calculating a round trip time using the first time, the second time, the third time, and the fourth time. In some embodiments, a device that calculates the round trip time receives any of the first time, the second time, the third time, and the fourth time, which were not recorded by the device, from one or more other devices.

As compared to existing approaches for calculating time of flight measurements, where the relevant time that is recorded is the reception time of a beginning of the transmitted packet (e.g., time t2" corresponding to reception of a beginning portion of FTM 312 by Device_2 in the example timing diagram 304 shown in FIG. 3), in accordance with some embodiments of the present disclosure, the relevant time that is recorded is the reception time of a subsequent packet that follows the transmitted packet (e.g., time t2" corresponding to reception of NDP 735 by Device_2 as shown in the example timing diagram 705 of FIG. 7).

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for facilitating time of flight measurements in a communication network, the method comprising:
   generating, at a first communication device, a physical layer (PHY) protocol data unit having i) a beginning portion and ii) an ending portion, wherein
      the beginning portion includes a PHY protocol header having a PHY protocol preamble,
      the ending portion includes a reference signal, and
      the PHY protocol data unit is configured to prompt a second communication device to record a reception time corresponding to reception of the reference signal by the second communication device;
   causing the first communication device to transmit the PHY protocol data unit to the second communication device;
   recording, at the first communication device, a transmission time corresponding to transmission of the reference signal by the first communication device; and
   at least one of:
      i) receiving the reception time from the second communication device and calculating, at the first communication device, a time of flight of the PHY protocol data unit using the reception time of the reference signal and the transmission time of the reference signal, and ii) causing the first communication device to transmit the transmission time to one or more of a) the second communication device and b) a third communication device that receives the reception time, to facilitate calculation of the time of flight of the PHY protocol data unit using the reception time and the transmission time.

2. The method of claim 1, wherein generating the physical layer PHY protocol data unit comprises:
generating the PHY protocol header such that the PHY protocol header includes information that signals to the second communication device that the ending portion of the PHY protocol data unit includes the reference signal.

3. The method of claim 1, further comprising:
calculating, at the first communication device, the time of flight of the PHY protocol data unit using the reception time and the transmission time.

4. An apparatus, comprising:
a network interface device associated with a first communication device, the network interface device having one or more integrated circuit devices configured to:
generate a physical layer (PHY) protocol data unit having i) a beginning portion and ii) an ending portion, wherein
the beginning portion includes a PHY protocol header having a PHY protocol preamble,
the ending portion includes a reference signal, and
the PHY protocol data unit is configured to prompt a second communication device to record a reception time corresponding to reception of the reference signal by the second communication device;
wherein the one or more integrated circuit devices are further configured to:
transmit the PHY protocol data unit,
record a transmission time corresponding to transmission of the reference signal by the first communication device, and
at least one of:
i) receive the reception time from the second communication device and calculate a time of flight of the PHY protocol data unit using the reception time and the transmission time, and
ii) transmit the transmission time to one or more of a) the second communication device, and b) a third communication device that receives the reception time, to facilitate calculation of the time of flight of the PHY protocol data unit using the reception time and the transmission time.

5. The apparatus of claim 4, wherein the one or more integrated circuit devices are further configured to:
generate the PHY protocol header such that the PHY protocol header includes information that signals to the second communication device that the ending portion of the PHY protocol data unit includes the reference signal.

6. The apparatus of claim 5, wherein the one or more integrated circuit devices are further configured to:
calculate the time of flight of the PHY protocol data unit using the reception time and the transmission time.

7. A method for facilitating time of flight measurements in a communication network, the method comprising:

receiving, at a first communication device, a physical layer (PHY) protocol data unit having i) a beginning portion and ii) an ending portion, wherein
the beginning portion includes a PHY protocol header having a PHY protocol preamble,
the ending portion includes a reference signal, and
the PHY protocol data unit is configured to prompt the first communication device to record a reception time corresponding to reception of the reference signal by the first communication device;
recording, at the first communication device, the reception time corresponding to reception of the reference signal by the first communication device; and
at least one of:
i) receiving a transmission time corresponding to transmission of the reference signal by a second communication device and calculating, at the first communication device, a time of flight of the PHY protocol data unit using the reception time and the transmission time, and
ii) causing the first communication device to transmit the reception time to the second communication device to facilitate calculation of the time of flight of the PHY protocol data unit using the reception time and the transmission time.

8. The method of claim 7, further comprising:
determining, at the first communication device, that the reference signal is included in the ending portion of the PHY protocol data unit using information in the PHY protocol header of the PHY protocol data unit.

9. The method of claim 7, further comprising:
calculating, at the first communication device, the time of flight of the PHY protocol data unit using the reception time and the transmission time.

10. An apparatus, comprising:
a network interface device associated with a first communication device, the network interface device having one or more integrated circuit devices configured to:
receive a physical layer (PHY) protocol data unit having i) a beginning portion and ii) an ending portion, wherein
the beginning portion includes a PHY protocol header having a PHY protocol preamble,
the ending portion includes a reference signal, and
the PHY protocol data unit is configured to prompt the first communication device to record a reception time corresponding to reception of the reference signal by the first communication device;
wherein the one or more integrated circuit devices are further configured to:
record the reception time corresponding to reception of the reference signal by the first communication device, and
at least one of:
i) receive a transmission time corresponding to transmission of the reference signal by a second communication device and calculate a time of flight of the PHY protocol data unit using the reception time and the transmission time, and
ii) cause the first communication device to transmit the reception time to the second communication device to facilitate calculation of the time of flight of the PHY protocol data unit using the reception time and the transmission time.

11. The apparatus of claim 10, wherein the one or more integrated circuit devices are further configured to:

determine that the reference signal is included in the ending portion of the PHY protocol data unit using information in the PHY protocol header of the PHY protocol data unit.

12. The apparatus of claim 10, wherein the one or more integrated circuit devices are further configured to:
calculate the time of flight of the PHY protocol data unit using the reception time and the transmission time.

13. The method of claim 1, wherein the method further comprises at least one of:
determining, at the first communication device, a distance between the first communication device and the second communication device using the time of flight; and
causing the first communication device to transmit the transmission time to one or more of a) the second communication device and b) a third communication device to facilitate determination of the distance between the first communication device and the second communication device using the time of flight.

14. The apparatus of claim 4, wherein the one or more integrated circuits are further configured to, at least one of:
determine a distance between the first communication device and the second communication device using the time of flight; and
cause the first communication device to transmit the time of flight to one or more of a) the second communication device and b) the third communication device to facilitate determination of the distance between the first communication device and the second communication device using the time of flight.

15. The method of claim 7, wherein the method further comprises, at least one of:
determining, at the first communication device, a distance between the first communication device and the second communication device using the time of flight; and
and causing the first communication device to transmit the time of flight to one or more of a) the second communication device and b) the third communication device to facilitate determination of the distance between the first communication device and the second communication device using the time of flight.

16. The apparatus of claim 10, wherein the one or more integrated circuits are further configured to, at least one of:
determine a distance between the first communication device and the second communication device using the time of flight; and
cause the first communication device to transmit the time of flight to one or more of a) the second communication device and b) a third communication device to facilitate determination of the distance between the first communication device and the second communication device using the time of flight.

17. The method of claim 1, wherein the ending portion includes a data portion of the PHY protocol data unit and the reference signal is at an end of the data portion.

18. The apparatus of claim 4, wherein the ending portion includes a data portion of the PHY protocol data unit and the reference signal is at an end of the data portion.

19. The method of claim 7, wherein the ending portion includes a data portion of the PHY protocol data unit and the reference signal is at an end of the data portion.

20. The method of claim 10, wherein the ending portion includes a data portion of the PHY protocol data unit and the reference signal is at an end of the data portion.

\* \* \* \* \*